United States Patent
Son et al.

(10) Patent No.: US 10,237,034 B2
(45) Date of Patent: Mar. 19, 2019

(54) DEVICE AND METHOD FOR TRANSMITTING FEEDBACK INFORMATION IN WIRELESS COMMUNICATION SYSTEM

(71) Applicant: Samsung Electronics Co., Ltd., Suwon-si (KR)

(72) Inventors: Jae-Seung Son, Suwon-si (KR); Kyeong-Yeon Kim, Hwaseong-si (KR); Chan-Hong Kim, Hwaseong-si (KR); Tae-Young Kim, Seoul (KR); Ji-Yun Seol, Seongnam-si (KR); Keon-Kook Lee, Suwon-si (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 15/508,886

(22) PCT Filed: Sep. 4, 2015

(86) PCT No.: PCT/KR2015/009374
§ 371 (c)(1),
(2) Date: Mar. 3, 2017

(87) PCT Pub. No.: WO2016/036205
PCT Pub. Date: Mar. 10, 2016

(65) Prior Publication Data
US 2017/0201363 A1 Jul. 13, 2017

(30) Foreign Application Priority Data

Sep. 4, 2014 (KR) .......................... 10-2014-0117798
Sep. 2, 2015 (KR) .......................... 10-2015-0124206

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0639* (2013.01); *H04W 88/02* (2013.01); *H04W 88/08* (2013.01)

(58) Field of Classification Search
CPC ...................................................... H04L 12/50
(Continued)

(56) References Cited

U.S. PATENT DOCUMENTS

2012/0008613 A1 1/2012 Lee et al.
2013/0258964 A1 10/2013 Nam et al.
(Continued)

*Primary Examiner* — Dang T Ton

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A terminal in a wireless communication system according to an embodiment of the present invention comprises: a controller for determining a first size corresponding to a number of bits allocated for a first PMI (precoding matrix indicator) and a second size corresponding to a number of bits allocated for a second PMI; and a transmitting unit for transmitting feedback information, including the first PMI corresponding to the first size and the second PMI corresponding to the second size, to a base station.

20 Claims, 34 Drawing Sheets

(51) Int. Cl.
*H04W 88/02* (2009.01)
*H04W 88/08* (2009.01)

(58) Field of Classification Search
USPC .......................................................... 370/400
See application file for complete search history.

(56) References Cited

U.S. PATENT DOCUMENTS

| | | |
|---|---|---|
| 2013/0308714 A1 | 11/2013 | Xu et al. |
| 2014/0016549 A1 | 1/2014 | Novlan et al. |
| 2014/0098689 A1 | 4/2014 | Lee et al. |
| 2018/0077284 A1* | 3/2018 | Nam .................. H04M 3/5191 |

* cited by examiner

16 Transmitting antenna (101)

| | L=0 | | | | | | | L=7 |
|---|---|---|---|---|---|---|---|---|
| K=7 | | | | $R_{14}$ | | | | $R_{15}$ |
| | | | $R_{12}$ | | | | $R_{13}$ | |
| | | $R_{10}$ | | | | $R_{11}$ | | |
| | $R_8$ | | | | $R_9$ | | | |
| | | | | $R_6$ | | | | $R_7$ |
| | | | $R_4$ | | | | $R_5$ | |
| | | $R_2$ | | | | $R_3$ | | |
| K=0 | $R_0$ | | | | $R_1$ | | | |

Frequency (subcarrier) / Time (symbol)

64 Transmitting antenna (103)

| | L=0 | | | | | | | L=7 |
|---|---|---|---|---|---|---|---|---|
| K=7 | $R_{37}$ | $R_{44}$ | $R_{35}$ | $R_{12}$ | $R_5$ | $R_{26}$ | $R_{18}$ | $R_{12}$ |
| | $R_8$ | $R_{54}$ | $R_{58}$ | $R_{15}$ | $R_9$ | $R_{13}$ | $R_7$ | $R_{18}$ |
| | $R_{37}$ | $R_{51}$ | $R_{13}$ | $R_{33}$ | $R_{61}$ | $R_{51}$ | $R_9$ | $R_{42}$ |
| | $R_{41}$ | $R_{56}$ | $R_8$ | $R_4$ | $R_5$ | $R_8$ | $R_6$ | $R_{14}$ |
| | $R_{13}$ | $R_{12}$ | $R_6$ | $R_6$ | $R_{12}$ | $R_{14}$ | $R_{19}$ | $R_{43}$ |
| | $R_{43}$ | $R_{15}$ | $R_{31}$ | $R_{29}$ | $R_{17}$ | $R_{62}$ | $R_{39}$ | $R_{12}$ |
| | $R_{13}$ | $R_4$ | $R_2$ | $R_5$ | $R_{14}$ | $R_9$ | $R_4$ | $R_5$ |
| K=0 | $R_0$ | $R_2$ | $R_{38}$ | $R_{14}$ | $R_1$ | $R_4$ | $R_5$ | $R_{13}$ |

Time (symbol)

FIG.1

| | : Block #0 (2700) |
| --- | --- |
| | : Block #1 (2701) |
| | : Block #2 (2702) |

DEVICE AND METHOD FOR TRANSMITTING FEEDBACK INFORMATION IN WIRELESS COMMUNICATION SYSTEM

CROSS-REFERENCE TO RELATED APPLICATION(S)

The present application claims priority under 35 U.S.C. § 365 to International Patent Application No. PCT/KR2015/009374 filed Sep. 4, 2015, entitled "DEVICE AND METHOD FOR TRANSMITTING FEEDBACK INFORMATION IN WIRELESS COMMUNICATION SYSTEM", and, through International Patent Application No. PCT/KR2015/009374, to Korean Patent Application No. 10-2014-0117798 filed Sep. 4, 2014, and to Korean Patent Application No. 10-2015-0124206 filed Sep. 2, 2015, each of which are incorporated herein by reference into the present disclosure as if fully set forth herein.

TECHNICAL FIELD

The present invention relates to feedback information transmission in a wireless communication system.

BACKGROUND ART

To meet the demand for wireless data traffic having increased since deployment of $4^{th}$ generation (4G) communication systems, efforts have been made to develop an improved $5^{th}$) generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To obtain a transmission gain in an FD-MIMO system, a terminal needs to recognize accurate channel information by each antenna of a base station providing a service to the terminal. The base station may allocate a Channel State Information (CSI)-Reference Signal (RS) by each antenna to a resource element in order to transmit the accurate channel information by each antenna of the base station to the terminal. The terminal may receive the CSI-RS by each antenna of the base station.

FIG. 1 illustrates an example of reference signal allocation by a transmitting antenna in a wireless communication system. Referring to FIG. 1, in an FD-MIMO system, when reference signals for antennas are allocated to resource elements (REs) corresponding to the increased number of antennas, a problem of a reduction in frequency/time resources available for data transmission occurs. For example, when 64 resource elements are available and the base station uses 16 transmitting antennas 101, if the base station allocates reference signals for the respective 16 transmitting antennas to separate resource elements among the 64 resource elements, the number of frequency/time resources for data transmission is reduced by those for the 16 reference signals. Further, when the base station uses 64 transmitting antennas 103, if the base station allocates reference signals for the respective 64 transmitting antennas to the separate 64 resource elements, no frequency/time resource may be left for data transmission.

As described above, when there is a plurality of transmitting antennas, a reference signal for each antenna needs to occupy an exclusive resource. Accordingly, when the base station allocates a reference signal for each of the plurality of antennas of the base station to a resource, resources for data transmission may be insufficient.

DETAILED DESCRIPTION OF THE INVENTION

Technical Problem

An embodiment of the present invention provides a device and a method for feeding back accurate channel information in a wireless communication system.

Another embodiment of the present invention provides a device and a method for a base station, which receives channel state information on a terminal, to obtain a performance gain according to the channel state information in a wireless communication system.

Still another embodiment of the present invention provides a device and a method for effectively transmitting channel information on a terminal to a base station through feedback information in a wireless communication system.

Yet another embodiment of the present invention provides a device and a method for determining the structures of a vertical precoding matrix indicator (hereinafter, 'PMI') and a horizontal PMI according to channel conditions in a wireless communication system.

Still another embodiment of the present invention provides a device and a method for determining a reference signal structure according to channel conditions in a wireless communication system.

Yet another embodiment of the present invention provides a device and a method for providing PMI information, which is selectable based on the position of a terminal, to the terminal in a wireless communication system.

Technical Solution

A terminal device in a wireless communication system according to an embodiment of the present invention includes: a controller configured to determine a first size corresponding to a number of bits assigned for a first Precoding Matrix Indicator (PMI) and a second size corresponding to a number of bits assigned for a second PMI; and a transmitter configured to transmit, to a base station, feedback information including the first PMI corresponding to the first size and the second PMI corresponding to the second size.

A base station device in a wireless communication system according to an embodiment of the present invention includes: a controller configured to determine a first size corresponding to a number of bits assigned for a first PMI and a second size corresponding to a number of bits assigned for a second PMI; and a receiver configured to receive, from a terminal, feedback information including the first PMI corresponding to the first size and the second PMI corresponding to the second size.

An operating method of a terminal in a wireless communication system according to an embodiment of the present invention includes: determining a first size corresponding to a number of bits assigned for a first PMI and a second size corresponding to a number of bits assigned for a second PMI; and transmitting, to a base station, feedback information including the first PMI corresponding to the first size and the second PMI corresponding to the second size.

An operating method of a base station in a wireless communication system according to an embodiment of the present invention includes: determining a first size corresponding to a number of bits assigned for a first PMI and a second size corresponding to a number of bits assigned for a second PMI; and receiving, from a terminal, feedback information including the first PMI corresponding to the first size and the second PMI corresponding to the second size.

Advantageous Effects

A wireless communication system adjusts the sizes of a plurality of Precoding Matrix Indicators (PMIs), thereby feeding back accurate information on a channel on an axis (domain) having a more significant effect and improving the performance of the system.

BRIEF DESCRIPTION OF THE DRAWINGS

FIG. 1 illustrates an example of reference signal allocation by a transmitting antenna in a wireless communication system;

MODE FOR CARRYING OUT THE INVENTION

Hereinafter, the operating principle of the present invention will be described in detail with reference to the accompanying drawings. In describing the present invention below, a detailed description of related known configurations or functions incorporated herein will be omitted when it is determined that the detailed description thereof may unnecessarily obscure the subject matter of the present invention. The terms which will be described below are terms defined in consideration of the functions in the present invention, and may be different according to users, intentions of the users, or customs. Therefore, the definitions of the terms should be made based on the contents throughout the specification.

Hereinafter, the present invention describes a technology for transmitting feedback information in a wireless communication system.

In the following description, terms used to indicate a signal type, terms used to indicate a layer in which a message is transmitted, terms used to indicate an antenna structure and components of an antenna, and terms used to indicate entries included in feedback information are illustrated for the convenience of description. Therefore, the present invention is not limited by the following terms, which may be replaced with other terms having the same technical meaning. Further, the present invention is not limited by the following terms and designations and may also be applied to systems in accordance with different standards.

Figure 2:
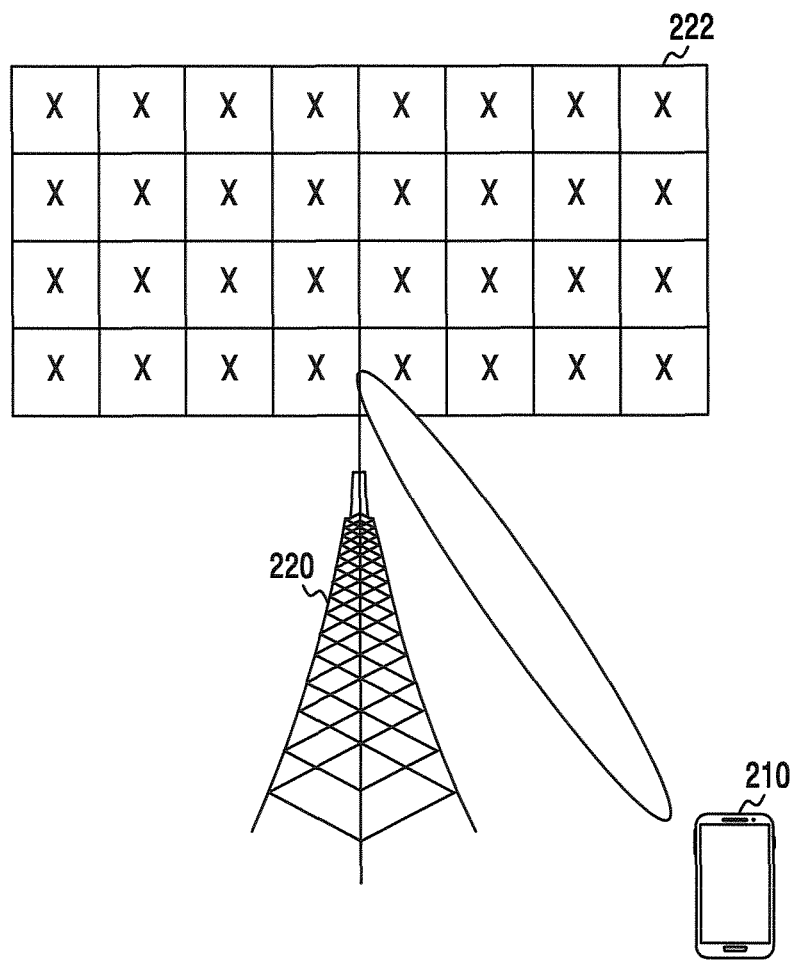
FIG. 2 illustrates a wireless communication system according to an embodiment of the present invention.

FIG. 2 illustrates a wireless communication system according to an embodiment of the present invention.

Referring to FIG. 2, a base station 220 may include an antenna array 222, that is, a plurality of transmitting antennas. The antenna array 222 may have a two-dimensional structure. Further, the antenna array 222 may be a linear polarized antenna or a cross pole antenna with a reduced antenna size. The antenna array 222 may be disposed such that a minimum distance between antennas is maintained in order to reduce interference between the antennas. For example, the minimum distance may be half of a wavelength of a radio signal transmitted from the antenna array 222.

The antenna array 222 may be used to transmit a reference signal to a terminal 210. That is, the base station 220 may transmit the reference signal to the terminal 210 through the antenna array 222. Here, the terminal 210 may receive at least one data stream from the base station 220. The data stream may be determined based on the number of receiving antennas of the terminal 210 and channel conditions.

Figure 3A:
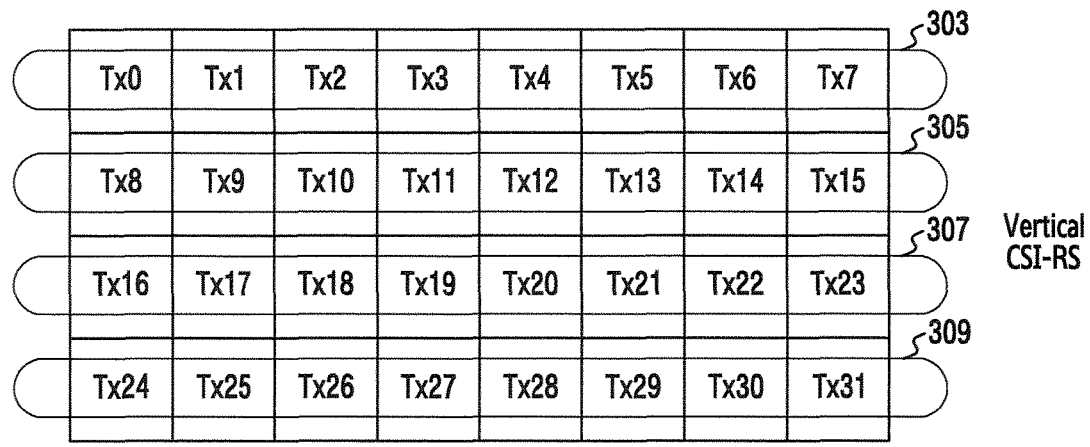
FIG. 3 illustrates examples of a vertical reference signal and a horizontal reference signal in a wireless communication system according to an embodiment of the present invention.
Figure 3B:
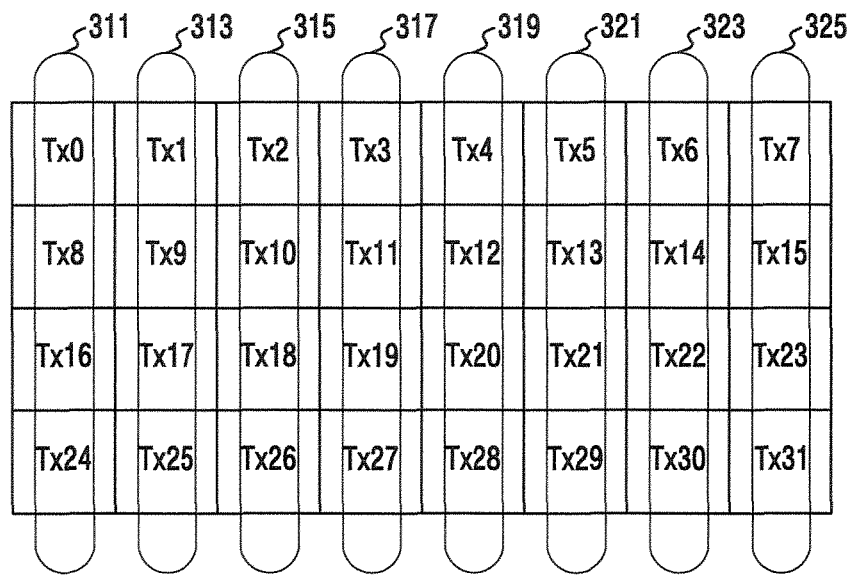

FIG. 3 illustrates examples of a vertical reference signal (RS) and a horizontal reference signal in a wireless communication system according to an embodiment of the present invention.

Referring to FIG. 3, a base station may transmit, to a terminal, a two-dimensional (2D) reference signal including a vertical reference signal and a horizontal reference signal. Here, the reference signal may be referred to as a Channel State Information (CSI) reference signal (RS). The terminal may transmit a vertical Precoding Matrix Indicator (hereinafter, 'PMI') and a horizontal PMI to the base station in response to the 2D reference signal.

The base station may transmit at least one reference signal representing a vertical axis or a horizontal axis of a base station antenna to the terminal. For example, as in (a) of FIG. 3, when the base station has 32 transmitting antennas, the base station may determine at least one reference signal representing antenna rows 304, 305, 307, and 309. That is, the base station may determine at least one antenna to simultaneously transmit a signal among the antennas of the base station. For example, the base station may determine at least one antenna to transmit a signal among antennas Tx0, Tx1, Tx2, Tx3, Tx4, Tx5, Tx6, and Tx7 in an antenna row 304 of the base station. The number of reference signals may be one of 1 to 8. That is, the number of antennas used for the base station to simultaneously transmit a signal may be one of 1 to 8. The base station may determine at least one reference signal representing each of the antenna rows 304, 305, 307, and 309, thereby constructing the vertical reference signal.

As in (b) of FIG. 3, the base station may determine at least one reference signal representing antenna columns 311, 313, 315, and 317. For example, the base station may determine at least one antenna to transmit a signal among antennas Tx0, Tx8, Tx16, and Tx24 in an antenna column 311 of the base station. The number of reference signals may be one of 1 to 4. The base station may determine at least one reference signal representing each of the antenna columns 311, 313, 315, and 317, thereby constructing the horizontal reference signal.

The base station may generate the vertical reference signals or the horizontal reference signals according to the vertical axis or the horizontal axis of the antennas of the base station as a reference signal to be transmitted to at least one terminal. The base station may transmit, to the at least one terminal, at least one of the vertical reference signals and the horizontal reference signals.

Figure 4A:
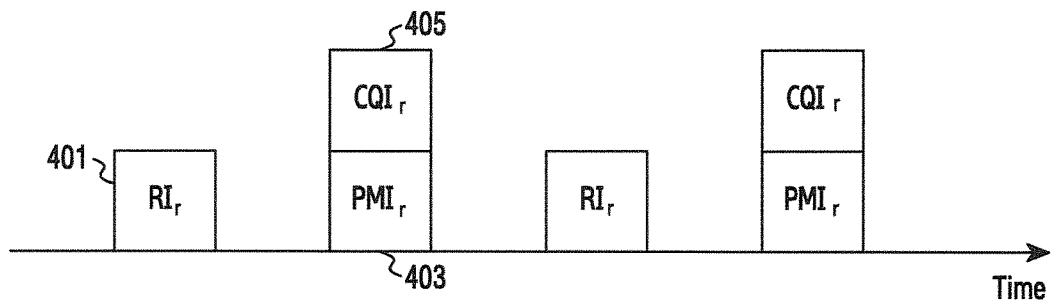
FIG. 4 illustrates an example of feedback information in a wireless communication system according to an embodiment of the present invention.
Figure 4B:
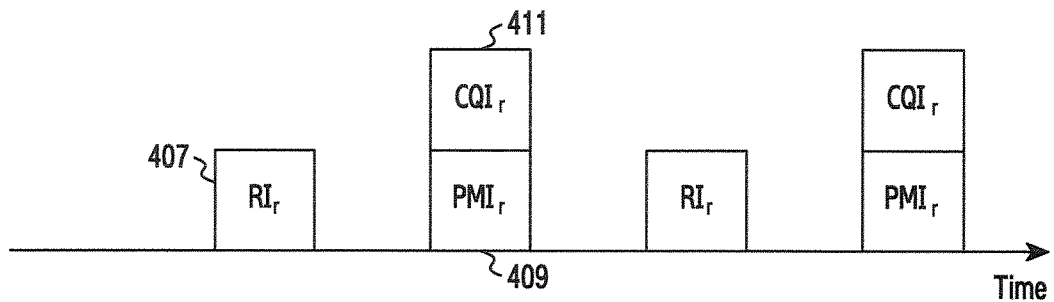

FIG. 4 illustrates an example of feedback information in a wireless communication system according to an embodiment of the present invention. FIG. 4 illustrates information entries included in the feedback information.

Referring to FIG. 4, a terminal may receive a vertical reference signal from a base station and may transmit feedback information on the vertical reference signal to the base station. For example, as in (a) of FIG. 4, the terminal may transmit, to the base station, a vertical Rank Indicator (hereinafter, 'RI') 401, a vertical PMI 403, a vertical Channel Quality Indicator (hereinafter, 'CQI') 405 according to time. The RI 401 may be determined as the number of receiving antennas of the terminal. The RI 401 may be reflected in the vertical PMI 403. That is, the feedback information may include as many vertical PMIs 403 as the RIs 401. For example, when there is one RI 401, the number of PMIs 403 may be 1. However, when there are two or more RIs 401, the number of PMIs 403 may change depending on the RIs 401. The PMI 403 is included as one parameter in an equation for calculating the CQI 405 and thus may affect the CQI 405. That is, the CQI 405 may be determined based on the PMI 403.

As in (b) of FIG. 4, the terminal may receive a horizontal reference signal from the base station and may transmit feedback information on the horizontal reference signal to the base station. For example, the terminal may transmit the feedback information to the base station according to time. The feedback information may include at least one of a horizontal RI 407, a horizontal PMI 409, and a horizontal CQI 411.

Among the feedback information described with reference to FIG. 4, the RI 401 or 407 denotes the number of spatial layers received by the terminal in a current channel state. The RI 401 or 307 may depend on the number of receiving antennas of the terminal. The PMI 403 or 309 may indicate a precoding matrix preferred by the terminal in the current channel state. The CQI 405 or 311 may be related to a maximum data rate that is obtained by the terminal at reception in the current channel state. The CQI 405 or 311 may be replaced with at least one of a Signal-to-Interference-plus-Noise Ratio (SINR), a maximum error correction code rate and modulation scheme, and data efficiency per frequency, which may be used similarly to the maximum data rate.

Figure 5:
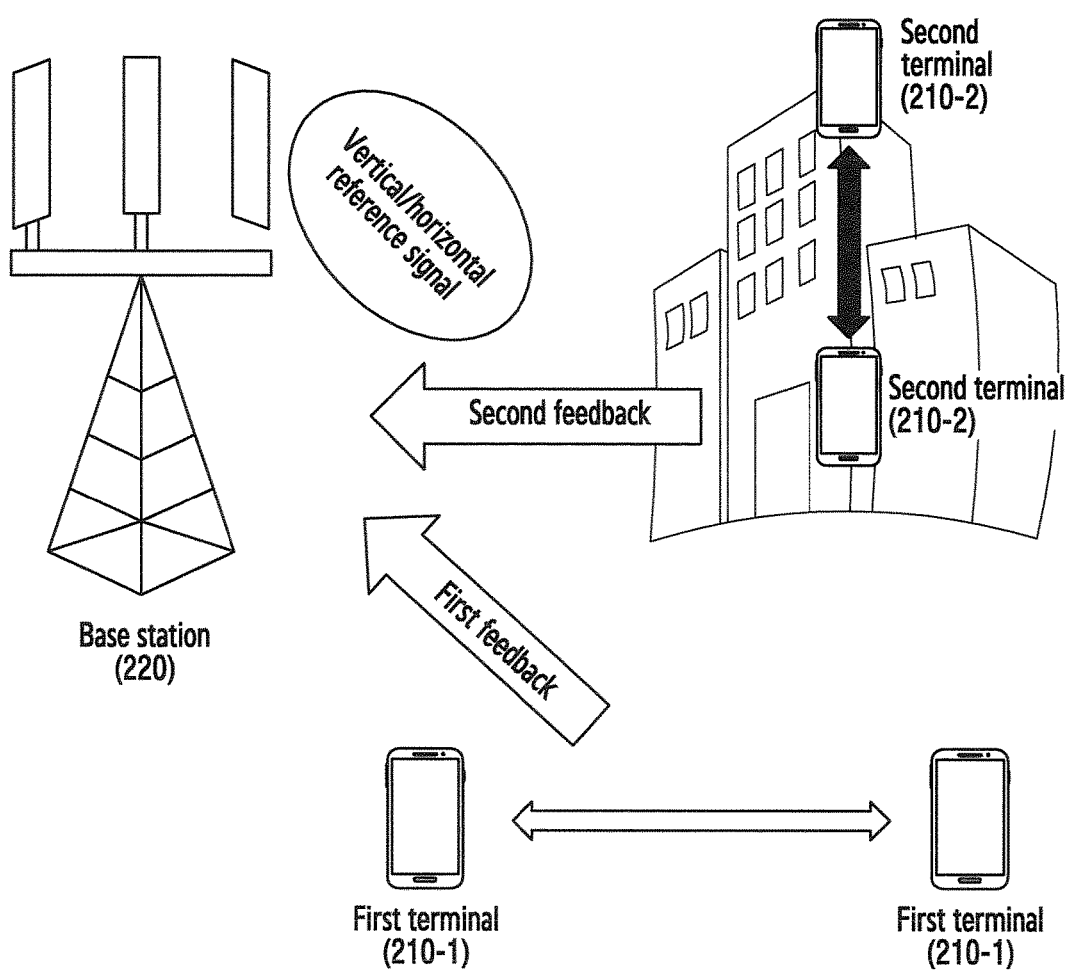
FIG. 5 illustrates an example of an environment for communication between a base station and a terminal in a wireless communication system according to an embodiment of the present invention.

FIG. 5 illustrates an example of an environment for communication between a base station and a terminal in a wireless communication system according to an embodiment of the present invention.

Referring to FIG. 5, a terminal may experience relatively more frequent horizontal movements and relatively more frequent vertical movement depending on users. For example, in FIG. 5, a first terminal 210-1 may experience more frequent horizontal movements. However, a second terminal 210-2 belongs to a user that frequently moves up and down in a building and thus may experience more frequent vertical movements. That is, the terminals 210-1 and 210-2 may receive different effects of channels depending on the position of the user or a specific environment.

Thus, the terminals 210-1 and 210-2 need accurate measurement on antenna columns on the vertical axis and antenna rows on the horizontal axis among the antennas of the base station 220 according to up-and-down movements or side-to-side movements. The terminals 210-1 and 210-2 may generate feedback information corresponding to a propensity to move using a vertical/horizontal reference signal transmitted from the base station 220 and may transmit the feedback information. For example, the first terminal 210-1, which experiences more frequent horizontal movements, needs to transmit accurate feedback information on a horizontal reference signal, received from the base station 220, to the base station 220. Further, the second terminal 210-2, which experiences more frequent vertical movements, needs to transmit accurate feedback information on a vertical reference signal, received from the base station 220, to the base station 220. That is, the terminals 210-1 and 210-2 may transmit the accurate feedback information suitable for an environment of the users of the terminals 210-1 and 210-2 to the base station 220 in order to obtain a performance gain. The feedback information may include at least one of an RI, a PMI, and a CQI. For example, the terminals 210-1 and 210-2 may determine at least one of the RI, the PMI, and the CQI based on a reference signal received from the base station 220 and may transmit the determined one to the base station 220. The base station 220 may perform downlink scheduling and data transmission based on the at least one of the RI, the PMI, and the CQI received from the terminals 210-1 and 210-2.

Figure 6A:
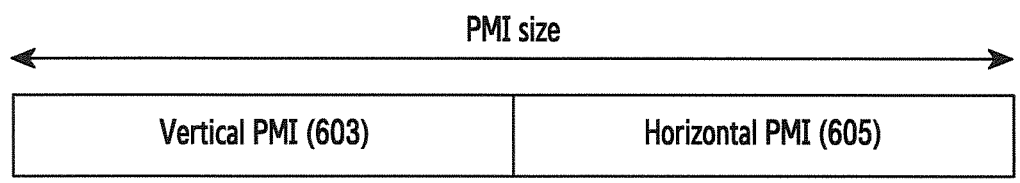
FIG. 6 illustrates an example of a configuration of feedback information in a wireless communication system according to an embodiment of the present invention.
Figure 6B:
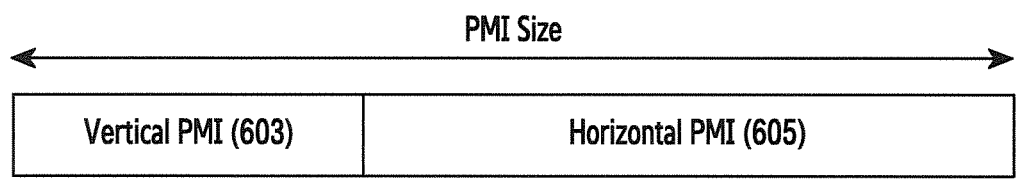
Figure 6C:
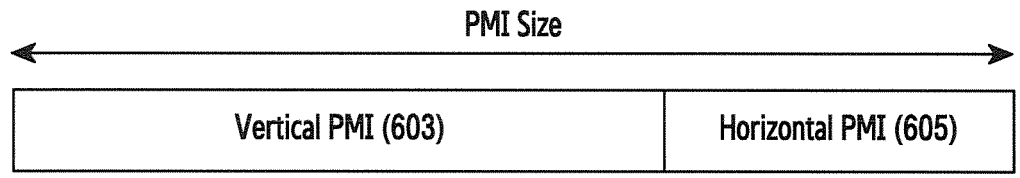

FIG. 6 illustrates an example of a configuration of feedback information in a wireless communication system according to an embodiment of the present invention. FIG. 6 illustrates PMIs among the feedback information.

Referring to FIG. 6, the feedback information may include a vertical PMI 603 and a horizontal PMI 605. Here, the terminal may determine the size of the horizontal PMI 605 and the size of the vertical PMI 603. Here, size refers to bit numbers of information, that is, the amount of overhead for transmitting the information. The size may be referred to as 'bit size.' The terminal may determine the horizontal PMI 605 and the vertical PMI 603 to have different sizes according to channel conditions of the terminal. Alternatively, the size of the horizontal PMI 605 and the size of the vertical PMI 603 may be determined by a base station and may be notified to the terminal. Further, the terminal may adjust the sizes of the PMIs according to receiving channel conditions.

For example, as in (a), bits of the vertical PMI 603 and the size of the horizontal PMI 605 may be determined to be the same based on the channel conditions of the terminal. For another example, when precise three-dimensional (3D) beamforming data transmission is needed more on the horizontal axis of a base station antenna than on the vertical axis according to the channel conditions of the terminal, the horizontal PMI 605 may be determined to have a greater size than the vertical PMI 603 as in (b). For still another example, when precise 3D beamforming data transmission is needed more on the vertical axis of the base station antenna than on the horizontal axis according to the channel conditions of the terminal, the vertical PMI 603 may be determined to have a greater size than the horizontal PMI 605 as in (c).

That is, when more accurate feedback on the vertical axis of the base station antenna is needed according to the channel conditions, the terminal may assign the vertical PMI 603 to have a greater size than the horizontal PMI 605, thereby configuring more accurate channel information on the vertical axis of the base station antenna than channel information on the horizontal axis of the base station antenna. On the contrary, when accurate feedback on the horizontal axis of the base station antenna is needed according to the channel conditions, the terminal may assign the horizontal PMI 605 to have a greater size than the vertical PMI 603, thereby configuring more accurate channel information on the horizontal axis of the base station antenna than channel information on the vertical axis of the base station antenna. A great-size PMI may have a larger number of candidate PMIs to select than a small-size PMI.

Figure 7:
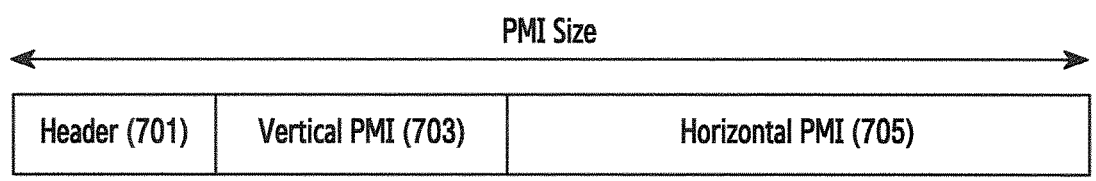
FIG. 7 illustrates another example of a configuration of feedback information in a wireless communication system according to an embodiment of the present invention.

FIG. 7 illustrates another example of a configuration of feedback information in a wireless communication system according to an embodiment of the present invention. FIG. 7 illustrates PMIs among the feedback information.

Referring to FIG. 7, the feedback information may include a header 701, a vertical PMI 703, and a horizontal PMI 705. The header 701 may include information on the size of the vertical PMI 703 and the size of the horizontal PMI 705. That is, the terminal may transmit the information on the sizes of the vertical/horizontal PMIs to the base station through the header 701. The size of the vertical PMI 703 and the size of the horizontal PMI 705 included in the header 701 may be predetermined between the base station and the terminal.

The vertical PMI 703 may be a precoding index that the terminal, which receives a vertical reference signal from the base station, determines as being most similar to a channel based on the vertical reference signal. The horizontal PMI may be a precoding index that the terminal, which receives a horizontal reference signal from the base station, determines as being most similar to a channel based on the horizontal reference signal.

As described above, feedback information transmitted from a terminal to a base station includes a vertical PMI and a horizontal PMI. To this end, the terminal or the base station needs to determine the size of the vertical PMI, the size of the horizontal PMI, the vertical PMI, and the horizontal PMI to be included in the feedback information.

According to one embodiment of the present invention, a vertical/horizontal PMI size and a vertical/horizontal PMI may be determined based on channel capacity. Specifically, the terminal or the base station may determine a combination of vertical/horizontal PMI sizes to maximize the channel capacity. Further, the terminal or the base station may determine a combination of vertical/horizontal PMIs to maximize the channel capacity. For example, the terminal may determine a combination of vertical/horizontal PMI sizes available for the terminal based on a reference signal received from the base station. That is, the terminal may determine the combination of the vertical/horizontal PMI sizes and the combination of the vertical/horizontal PMIs to maximize the channel capacity by applying a selectable combination of vertical/horizontal PMIs to the combination of the vertical/horizontal PMI sizes available for the terminal. For example, when bit numbers assigned for the terminal to feed back a PMI are 8 bits, a combination of a 2-bit horizontal PMI and a 6-bit vertical PMI, a combination of a 4-bit horizontal PMI and a 4-bit vertical PMI, and a combination of a 6-bit horizontal PMI and a 2-bit vertical PMI are available. The terminal may determine a precoding matrix based on a PMI size supportable in each vertical/horizontal domain.

For example, the terminal or the base station may determine the combination of the vertical/horizontal PMI sizes and the combination of the vertical/horizontal PMIs to maximize the channel capacity using Equation 1.

$$P_{\hat{p}} = arg \max_{P_{\hat{p}} \in P} \sum_{k=0}^{N-1} \log_2 det\left(I_{N_r^c} + \frac{E_s}{N_0} H_{HV}(k) P_{\hat{p}} P_{\hat{p}}^H H_{HV}^H(k)\right)$$ [Equation 1]

In Equation 1, $P_{\hat{p}}$ denotes a combination of a vertical PMI and a horizontal PMI; P denotes a set of PMI combinations; N denotes the number of subcarriers included in a resource block to be subjected to channel capacity measurement; $N_r^c$ denotes the number of receiving antennas; $I_{N_r^c}$ denotes an identity matrix with size $N_r^c$; $E_s$ denotes received signal power; $N_0$ denotes noise power; $H_{HV}(k)$ denotes a combination of a horizontal channel and a vertical channel for a subcarrier with index k; $P_{\hat{p}}^H$ denotes a Hermitian matrix of $P_{\hat{p}}$; and $H_{HV}^H(k)$ denotes a Hermitian matrix of $H_{HV}(k)$.

$H_{HV}(k)$ is a $N_r^c \times (N_H N_V)$ matrix and may be generated by the Kronecker product of $$H_H = \begin{bmatrix} h_1^{(H)} \\ \vdots \\ h_{R_x}^{(H)} \end{bmatrix} \text{ and } H_V = \begin{bmatrix} h_1^{(V)} \\ \vdots \\ h_{R_x}^{(V)} \end{bmatrix}.$$

$H_H$ denotes a channel measured based on a horizontal reference signal, and $H_V$ denotes a channel measured based on a vertical reference signal. That is, $H_{HV}$ may be calculated by the Kronecker product of $H_H$ and $H_V$. $P_{\hat{p}}$ is a $N_H N_V \times 1$ matrix and may be generated by the Kronecker product of $$P_H = \begin{bmatrix} p_1 \\ \vdots \\ p_{N_H} \end{bmatrix} \text{ and } P_V = \begin{bmatrix} p_1 \\ \vdots \\ p_{N_V} \end{bmatrix}.$$

$P_H$ and $P_V$ denote precoding matrices determined based on a bit resolution. Further, $N_H$ denotes the number of horizontal antennas, and $N_V$ denotes the number of vertical antennas.

Figure 8:
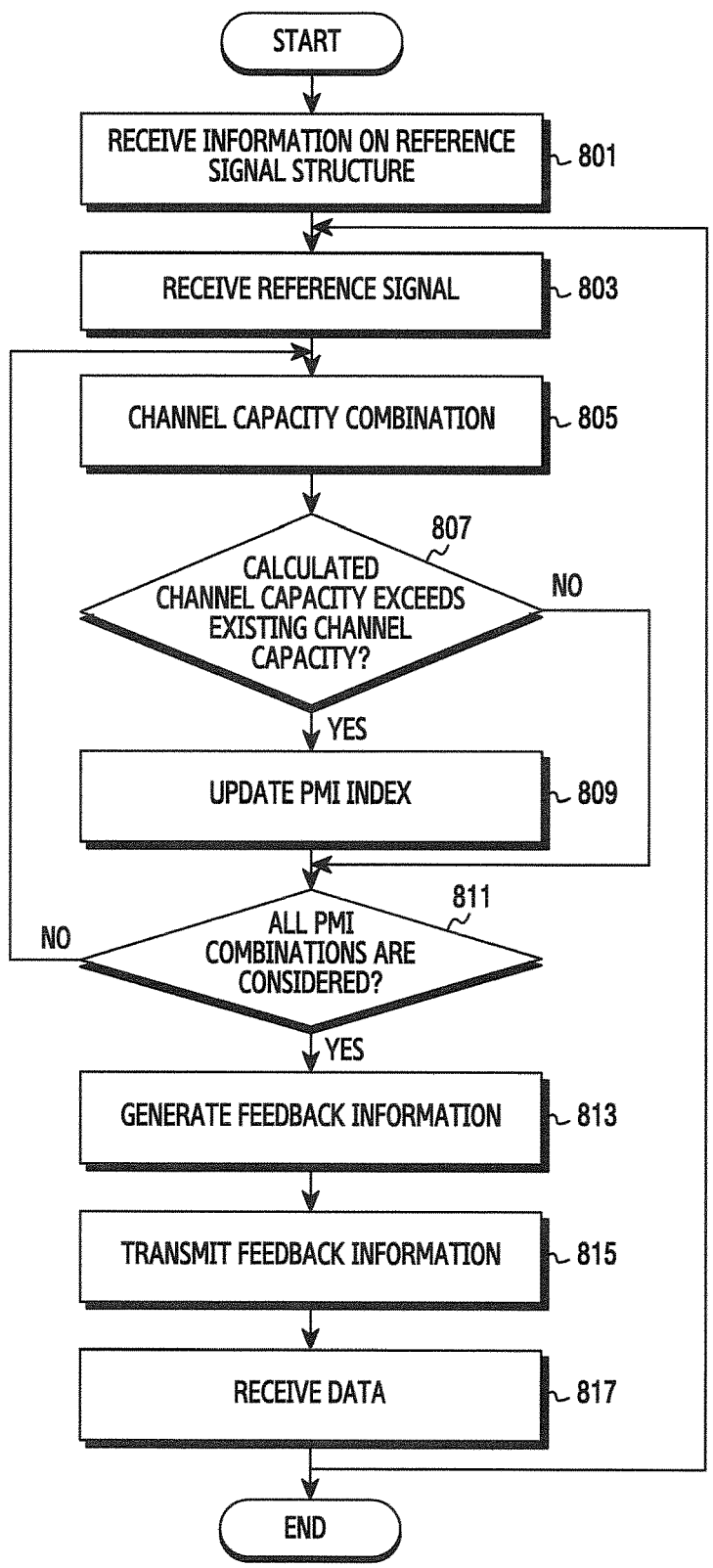
FIG. 8 illustrates a procedure for determining a feedback information size according to channel capacity in a wireless communication system according to an embodiment of the present invention.

FIG. 8 illustrates a procedure for determining a feedback information size according to channel capacity in a wireless communication system according to an embodiment of the present invention. FIG. 8 illustrates a method for a terminal to determine a vertical/horizontal PMI size based on channel capacity.

Referring to FIG. 8, the terminal receives information on a reference signal structure in operation 801. The information on the reference signal structure may include at least one of a vertical/horizontal reference signal structure, a feedback period of a vertical/horizontal reference signal, and PMI subset restriction information. For example, the terminal may receive the information on the reference signal structure from the base station through a Radio Resource Control (RRC) signal.

The terminal receives reference signals from the base station in operation 803. The terminal may receive at least one of a horizontal reference signal and a vertical reference signal from the base station. The horizontal reference signal refers to reference signals representing antenna rows on the horizontal axis among antennas of the base station, and the vertical reference signal refers to reference signals representing antenna columns on the vertical axis among the antennas of the base station.

The terminal calculates channel capacity in operation 805. That is, the terminal determines channel capacity corresponding to a selected vertical/horizontal PMI size and a selected vertical/horizontal PMI. Subsequently, the terminal determines whether the calculated channel capacity exceeds existing channel capacity in operation 807. Here, the existing channel capacity refers to channel capacity corresponding to a previously selected vertical/horizontal PMI size and a previously selected vertical/horizontal PMI. That is, the terminal determines whether the newly determined channel capacity is greater than the channel capacity determined in a previous repetition operation.

When the calculated channel capacity does not exceed the existing channel capacity, the terminal determines whether channel capacity is calculated with respect to all vertical/horizontal PMI combinations in operation 811. In this case, when the calculated channel capacity is less than the existing channel capacity, the terminal does not update the PMI index.

When the calculated channel capacity exceeds the existing channel capacity, the terminal may update PMI information for transmitting information on a combination of vertical/horizontal PMI sizes and a combination of vertical/horizontal PMIs to maximize the channel capacity to the base station in operation 809. That is, the terminal updates vertical/horizontal PMIs to be included in feedback information. Accordingly, the vertical/horizontal PMI sizes and the vertical/horizontal PMIs to be included in the feedback information may be changed.

Subsequently, the terminal determines whether all vertical/horizontal PMI combinations are considered in operation 811. The terminal determines whether channel capacity is calculated with respect to all PMI combinations available in each vertical/horizontal domain.

Next, the terminal generates feedback information in operation 813. The feedback information may include at least one of the combination of vertical/horizontal PMI sizes to maximize the channel capacity and the combination of vertical/horizontal PMIs to maximize the channel capacity. The terminal may generate the feedback information based on at least one of the combination of a horizontal PMI size and a vertical PMI size to maximize the channel capacity and the combination of vertical/horizontal PMIs to maximize the channel capacity, which are finally selected by applying all vertical/horizontal PMI combinations to Equation 1. The feedback information may include a header including information on the size of the horizontal PMI and the size of the vertical PMI, the horizontal PMI, and the vertical PMI.

The terminal transmits the feedback information to the base station in operation 815. That is, the terminal transmits the vertical PMI and the horizontal PMI to the base station. Here, the terminal may transmit information on the combination of vertical/horizontal PMI sizes through the header of the feedback information so that the base station recognizes the information on the combination of vertical/horizontal PMI sizes.

The terminal receives data transmitted from the base station in operation 817. The terminal may receive data transmitted from the base station according to the feedback information received by the base station from the terminal. That is, the terminal may receive a data signal precoded with the vertical/horizontal PMIs included in the feedback information.

When the terminal receives a next reference signal from the base station, the operations of the terminal and the base station described with reference to FIG. 8 may be repeated. According to another embodiment of the present invention, after transmitting the data from the base station, the terminal may end the foregoing procedure.

According to another embodiment of the present invention, the terminal may receive feedback configuration information from the base station. The feedback configuration information may include a PMI index table supportable according to the position of the terminal and information on the base station. That is, the base station may transmit the PMI index table to the terminal through a PMI codebook configuration. For example, the base station may transmit PMI information to the terminal through the feedback configuration information. Further, the base station may notify the terminal of the number of horizontal reference signals or vertical reference signals used by the base station and information entries included in feedback information to be transmitted from the terminal to the base station. For example, the feedback configuration information may be transmitted through an RRC signal. Specifically, the feedback configuration information may be configured as in Table 1.

TABLE 1

| Feedback configuration information | Note |
|---|---|
| First channel information (horizontal channel): CSI-RS-1 | Number of horizontal reference signals |
| Second channel information (vertical channel): CSI-RS-2 | Number of vertical reference signals |
| Report (feedback) mode | Combination of RI, PMI, CQI |
| PMI codebook information | Available PMI information |
| PMI codebook configuration | Vertical/horizontal PMI size information |
| Other information | |

Referring to Table 1, the "first channel information (horizontal channel): CSI-RS-1" includes information on a horizontal reference signal including the number of horizontal reference signals to be measured by the terminal. That is, the "first channel information (horizontal channel): CSI-RS-1" is related to a reference signal with respect to antenna rows on the horizontal axis among the antennas of the base station. The base station may report through the "first channel information (horizontal channel): CSI-RS-1" how many reference signals the terminal needs to measure with respect to the antenna rows of the base station. The terminal may determine a horizontal PMI based on the "first channel information (horizontal channel): CSI-RS-1" received from the base station.

The "second channel information (vertical channel): CSI-RS-2" includes information on a vertical reference signal to be measured by the terminal. For example, the "second channel information (vertical channel): CSI-RS-2" may include the number of vertical reference signals to be measured by the terminal. That is, the "second channel information (vertical channel): CSI-RS-2" is related to a reference signal with respect to the antenna column on the vertical axis among the antennas of the base station. The base station may report through the "second channel information (vertical channel): CSI-RS-2" how many reference signals the terminal needs to measure with respect to the antenna columns of the base station. The terminal may determine a vertical PMI based on the "second channel information (vertical channel): CSI-RS-2" received from the base station.

The "report (feedback) mode" indicates a combination of an RI, a PMI, and a CQI to be transmitted by the terminal to the base station. The CQI may include at least one of a wideband CQI and a subband CQI. The terminal may determine the combination of the RI, the PMI, and the CQI to be included in feedback information based on the "report (feedback) mode." Specifically, the "report (feedback) mode" may be configured as below in Table 2.

TABLE 2

| mode | Combination |
|---|---|
| Report mode 1-0 | RI, wideband CQI(wCQI) |
| Report mode 1-1 | RI, wideband CQI, PMI |
| Report mode 2-0 | RI, wideband CQI, subband CQI(sCQI) |
| Report mode 2-1 | RI, wideband CQI, subband CQI, PMI |

The "PMI codebook information" denotes information on a set of precoding matrices available for feedback by the terminal to the base station. For example, when the PMI codebook information is not included in RRC information for feedback, the terminal may determine that all precoding matrices defined in a standard applied to a system are used for feedback. The terminal may determine a combination of a vertical PMI size and a horizontal PMI size to maximize channel capacity based on the "PMI codebook information." The "PMI codebook information" may be determined by the base station, and may be determined based on a horizontal PMI size and a vertical PMI size that may be determined by the terminal according to another embodiment of the present invention.

The "PMI codebook configuration" includes information on a vertical PMI size and a horizontal PMI size. According to one embodiment of the present invention, the "PMI codebook configuration" may include all PMI indices available for the base station. For example, the terminal, which receives the "PMI codebook configuration" from the base station, may select at least one PMI index to be used by the terminal among the all PMI indices. According to another embodiment of the present invention, the "PMI codebook configuration" may include only a PMI index related to a PMI size combinable by the base station. That is, the "PMI codebook configuration" may include at least one of one previously agreed PMI index and a PMI index related to a combinable PMI size.

According to another embodiment of the present invention, a vertical/horizontal PMI size and a vertical/horizontal PMI may be determined based on the position of a terminal. For example, when the height of an antenna of the base station is low, the base station may assign a vertical PMI index heading from the base station to the ground to the terminal. When the terminal is close to the base station, a vertical PMI size selectable by the base station may be increased depending on the height. On the contrary, when the terminal is distant from the base station, the selectable vertical PMI size may be decreased depending on the height of the terminal.

To determine a combination of vertical/horizontal PMI sizes and a combination of vertical/horizontal PMIs based on the position of the terminal and the position of the base station, a PMI index table and information on the base station may be used. The PMI index table and the information on the base station may be included in the "PMI codebook configuration" to be transmitted to the terminal. The information on the base station may include at least one of the type of the base station, the height of an antenna of the base station, and information on the position of the base station. For example, the type of the base station may be at least one of a macro eNB (eNodeB) and a micro eNB. If the information on the position of the base station and information on the position of the at least one terminal are reflected, the PMI index table indicates a vertical PMI index and a horizontal PMI index, which are selectable based on the distance from the base station and the height. For example, a PMI index table defined below in Table 3 may be used.

TABLE 3

| Header index | Distance value | Altitude value | Vertical PMI index |
|---|---|---|---|
| 1 | 1 | 1 | 1 |
| 2 | | 2 | 2, 3, 4, 5 |
| 3 | | 3 | 3, 4, 5, 6 |
| 4 | 2 | 1 | 2 |
| 5 | | 2 | 3, 4, 5 |
| 6 | | 3 | 4, 5, 6 |
| 7 | 3 | 1 | 3 |
| 8 | | 2 | 4, 5 |
| 9 | | 3 | 5, 6 |

In Table 3, the "header index" is used to notify the base station of a size selected by the terminal in view of distance and altitude. The "distance value" is used to distinguish a plurality of sections divided according to a transmission distance supportable by the base station. For example, in a cell with a coverage of 400 m, when the terminal is located close to the base station (for example, within 100 m), the distance value may be set to 1. For another example, when the terminal is located distant from the base station (for example, with 400 m), the distance value may be 3. The "altitude value" is used to distinguish a height. The altitude value may be determined based on height information on the terminal.

The "vertical PMI index" denotes a zenith angle available for the base station in transmission. For example, the vertical PMI index equal to 1 may indicate that the zenith angle available for the base station in transmission is equal to or greater than 150 degrees and less than 180 degrees. The vertical PMI index equal to 2 may indicate that the zenith angle available for the base station in transmission is equal to or greater than 120 degrees and less than 150 degrees. The vertical PMI index equal to 6 may indicate that the zenith angle available for the base station in transmission is equal to or greater than 0 degrees and less than 30 degrees.

The terminal may identify at least one corresponding vertical PMI index in the PMI index table using the height of the terminal and the distance from the base station. The terminal may determine a vertical/horizontal PMI to maximize channel capacity within the range of the identified at least one vertical PMI index. That is, the terminal may determine an optimal vertical/horizontal PMI within a range restricted according to a PMI index table received from the base station, instead of examining all PMIs. That is, the terminal examines only PMIs given in the PMI index table, thereby reducing computational complexity.

Figure 9:
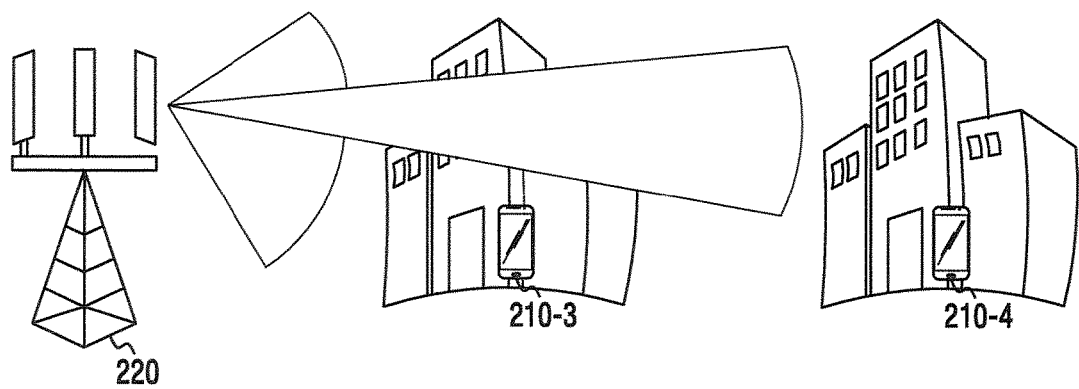
FIG. 9 illustrates an example of an environment in which a terminal configures feedback information according to the distance between the terminal and a base station in a wireless communication system according to an embodiment of the present invention.

According to still another embodiment of the present invention, a vertical/horizontal PMI size and a vertical/horizontal PMI may be determined based on a distance between a terminal and a base station. FIG. 9 illustrates an example of an environment in which a terminal configures feedback information according to the distance between the terminal and a base station in a wireless communication system according to an embodiment of the present invention. Referring to FIG. 9, when terminals 210-3 and 210-4 have information on the distances between the terminals 210-3 and 210-4 and the base station 220, the terminals 210-3 and 210-4 may not use the altitude value. The base station 220 may support a service for all heights of the terminals 210-3 and 210-4 only using a specific vertical PMI according to the distances between the base station 220 and the terminals 210-3 and 210-4. In this case, the terminals 210-3 and 210-4 may not need to consider channel capacity with respect to all vertical PMIs. Table 4 below illustrates PMI index tables used when the terminals 210-3 and 210-4 know the distances from the base station 220. The terminals 210-3 and 210-4 may determine the range of a vertical PMI to be calculated based on the distances from the base station 220.

TABLE 4

| Header index | Distance value | Vertical PMI index |
|---|---|---|
| 1 | 1 | 1~6 |
| 2 | 2 | 2~5 |
| 3 | 3 | 3~4 |

The terminals 210-3 and 210-4 may receive information, such as Table 3 and Table 4, from the base station 220 through an RRC signal. In this case, comparing with the embodiment illustrated with reference to FIG. 8, the terminals 210-3 and 210-4 may calculate channel capacity only within a PMI index range determined based on at least one of the distances from the base station and the heights of the terminals, instead of considering all PMIs through the repetition of operation 805, operation 807, operation 809, and operation 811.

According to yet another embodiment of the present invention, a vertical/horizontal PMI size may be determined based on a correlation between channels in each domain (for example, vertical or horizontal). Such determination is performed using the fact that in a high correlation between channels, even though the size of a PMI to indicate a channel in a corresponding domain (for example, vertical or horizontal) is not great, performance is not substantially affected. The correlation between the channels may be determined by Equation 2.

$$H_H = \begin{bmatrix} h_1^{(H)} \\ \vdots \\ h_{N_r^c}^{(H)} \end{bmatrix}, H_V = \begin{bmatrix} h_1^{(V)} \\ \vdots \\ h_{N_r^c}^{(V)} \end{bmatrix}$$

$$\rho_{ij,pq} = \frac{E\{h_{ij} h_{pq}^*\}}{\sqrt{E\{h_{ij} h_{ij}^*\} E\{h_{pq} h_{pq}^*\}}} \begin{cases} i, p = 1, 2, \ldots, N_r^c \\ j, q = 1, 2, \ldots, N_V \text{ or } N_H \end{cases}$$

[Equation 2]

In Equation 2, $H_H$ denotes a horizontal channel for a receiver antenna, and $H_V$ denotes a vertical channel for the receiver antenna. The size of a receiving channel matrix for a horizontal reference signal may be represented by $N_r^c \times N_H$, and the size of a receiving channel matrix for a vertical reference signal may be represented by $N_r^c \times N_V$. $\rho_{ij,pq}$ denotes a channel correlation value, $h_{ij}$ denotes the value of a channel between an i-th receiving antenna and a j-th transmitting antenna, $N_r^c$ denotes the number of receiving antennas, $N_H$ denotes the number of horizontal antennas, and $N_V$ denotes the number of vertical antennas.

The terminal may calculate a correlation between channels based on the reference signals according to Equation 2. The terminal may determine a combination of vertical/horizontal PMI sizes based on the calculated correlation between the channels. For example, when the correlation between the channels is high, a PMI to represent a channel may not need to have a great size. Thus, the terminal measures a channel correlation of the vertical reference signal or the horizontal reference signal. When a correlation between channels in a domain is a predetermined threshold or higher, the terminal may assign fewer bits than a threshold to the domain (for example, vertical or horizontal). On the contrary, when the correlation between the channels on the axis is less than the predetermined threshold, the terminal may assign threshold bits or greater to the domain (for example, vertical or horizontal). To determine a combination of vertical/horizontal PMI sizes based on the correlation, the terminal may operate as in FIG. 10.

Figure 10:
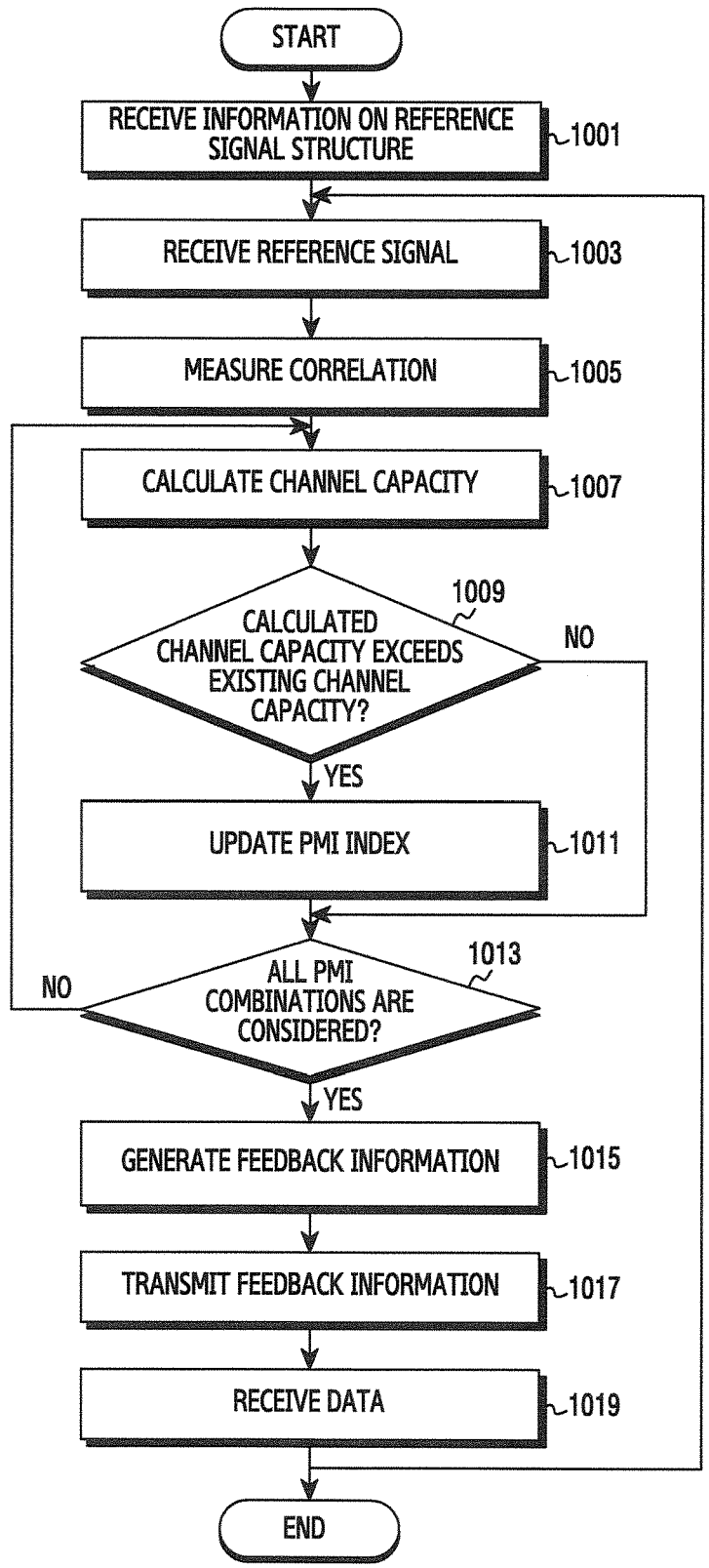
FIG. 10 illustrates a procedure for determining a feedback information size according to a correlation between channels in a wireless communication system according to an embodiment of the present invention.

FIG. 10 illustrates a procedure for determining a feedback information size according to a correlation between channels in a wireless communication system according to an embodiment of the present invention. FIG. 10 illustrates a method for a terminal to determine a vertical/horizontal PMI size based on the correlation. FIG. 10 illustrates an operating method of the terminal 210.

Referring to FIG. 10, the terminal receives information on a reference signal structure from the base station in operation 1001. The information on the reference signal structure may include at least one of a vertical/horizontal reference signal structure, a feedback period of a vertical/horizontal reference signal, and PMI subset restriction information. The terminal may receive the information on the reference signal structure from the base station through an RRC signal.

The terminal receives a reference signal from the base station in operation 1003. The reference signal may include at least one of a horizontal reference signal and a vertical reference signal. The terminal may receive at least one of the horizontal reference signal and the vertical reference signal according to the vertical/horizontal reference signal structure received from the base station.

The terminal measures a correlation between channels in operation 1005. That is, the terminal measures a correlation between channels estimated through vertical reference signals and a correlation between channels estimated through horizontal reference signals. For example, the terminal may determine the correlation according to Equation 2. Accordingly, vertical/horizontal PMI sizes may be determined.

The terminal calculates channel capacity in operation 1007. The terminal may determine a combination of vertical/horizontal PMIs to maximize the channel capacity with respect to a combination of the vertical/horizontal PMI sizes determined based on the correlation between the channels. The terminal may determine a combination of vertical/horizontal PMIs to maximize the channel capacity according to Equation 1 within the range of the combination of the determined vertical/horizontal PMI sizes.

The terminal compares the calculated channel capacity with existing channel capacity in operation 1009. When the calculated channel capacity exceeds the existing channel capacity, the terminal may update a PMI index to be transmitted to the base station in operation 1011. That is, the terminal updates the combination of vertical/horizontal PMIs to maximize the channel capacity to the PMI index. When the calculated channel capacity is less than the existing channel capacity, the terminal may determine whether all available vertical/horizontal PMIs are substituted into Equation 1 in operation 1013. Further, when the calculated channel capacity does not exceed existing channel capacity, the terminal may not update the combination of the vertical/horizontal PMIs used in the above calculation to the PMI index.

The terminal determines whether all PMI combinations are considered in operation 1013. The terminal may determine whether all available vertical/horizontal PMI combinations within the combination of the determined vertical/horizontal PMI sizes are considered. The terminal may repeat operation 1007 to operation 1011 until the calculation is completed with respect to all vertical/horizontal PMI combinations substitutable into Equation 1 based on a size supportable for each vertical/horizontal PMI domain. When the calculation is completed with respect to all vertical/horizontal PMI combinations, the terminal may generate feedback information based on information on a finally selected vertical/horizontal PMI combination. That is, the terminal may input information on the combination of the determined vertical/horizontal PMI sizes in a header of the feedback information.

The terminal transmits the feedback information to the base station in operation 1017. The terminal may transmit, to the base station, the feedback information including at least one of the combination of the vertical/horizontal PMI sizes determined based on the correlation between the channels and the combination of the vertical/horizontal PMIs to maximize the channel capacity.

The terminal receives data transmitted from the base station in operation 1019. The base station may transmit data to the terminal according to the feedback information received from the terminal. The terminal may receive data transmitted from the base station.

When the terminal receives a next reference signal from the base station, the foregoing operations of the terminal and the base station may be repeated. According to another embodiment of the present invention, after transmitting the data from the base station, the terminal may end the foregoing procedure.

According to still another embodiment of the present invention, a vertical/horizontal PMI size may be determined based on a feedback period. More bits may be assigned for a domain receiving relatively more frequent feedback than for a domain receiving relatively less frequent feedback. Fewer bits may be assigned for the domain receiving relatively less frequent feedback than for the domain receiving relatively more frequent feedback. Accordingly, a PMI in the domain receiving relatively less frequent feedback is divided according to time. That is, the terminal may feed back a PMI for a low-resolution domain through a plurality of transmissions and may feed back a PMI for a high-resolution domain through a relatively smaller number of transmissions (for example, one transmission).

Figure 11:
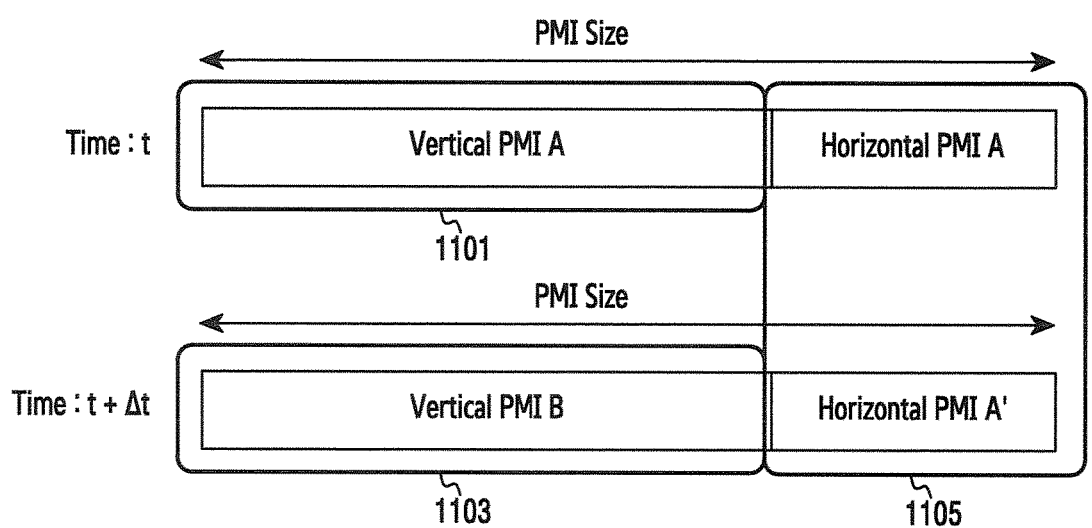
FIG. 11 illustrates an example of feedback information at each feedback time in a wireless communication system according to an embodiment of the present invention.

FIG. 11 illustrates an example of feedback information at each feedback time in a wireless communication system according to an embodiment of the present invention. FIG. 11 illustrates a case in which the feedback period of a horizontal PMI is longer that the feedback period of a vertical PMI. Referring to FIG. 11, defining feedback times as t and t+Δt, vertical PMIs 1101 and 1103 are fed back through separate transmissions, that is, at the respective feedback times. However, a horizontal PMI 1105 may be divided to be fed back through two transmissions. Specifically, the terminal transmits a first vertical PMI 1101 and part of the horizontal PMI 1105 at a feedback time t and transmits a second vertical PMI 1103 and the remaining part of the horizontal PMI 1105 at a feedback time tΔt. Accordingly, the base station may receive the first vertical PMI 1101 and the second vertical PMI 1103 at the respective feedback times t and t+Δt to identify the vertical PMIs 1101 and 1103. On the other hand, the base station may receive the part of the horizontal PMI 1105 and the remaining part of the horizontal PMI 1105 at the feedback times t and t+Δt and may combine the divided parts of the horizontal PMI 1105 to identify the whole horizontal PMI 1105.

Further, the terminal may transmit a vertical/horizontal PMI size to the base station through a header of feedback information. That is, the terminal may notify the base station of a configuration of the feedback information through the header. When feedback information is divided like the horizontal PMI 1105, the terminal may notify the base station of information on a transmission period of the divided feedback information. For example, in the horizontal PMI 1105, one PMI is transmitted through two transmissions, and thus a transmission period is 2.

According to yet another embodiment of the present invention, a vertical/horizontal PMI size may be determined based on the directivity of a terminal. The mobility of the terminal may be estimated by various techniques using a positioning reference signal (RS), a Global Positioning System (GPS), an altimeter, or the like. Here, more bits may be allocated for a domain (for example, vertical or horizontal) receiving a greater effect of the estimated mobility.

Figure 12:
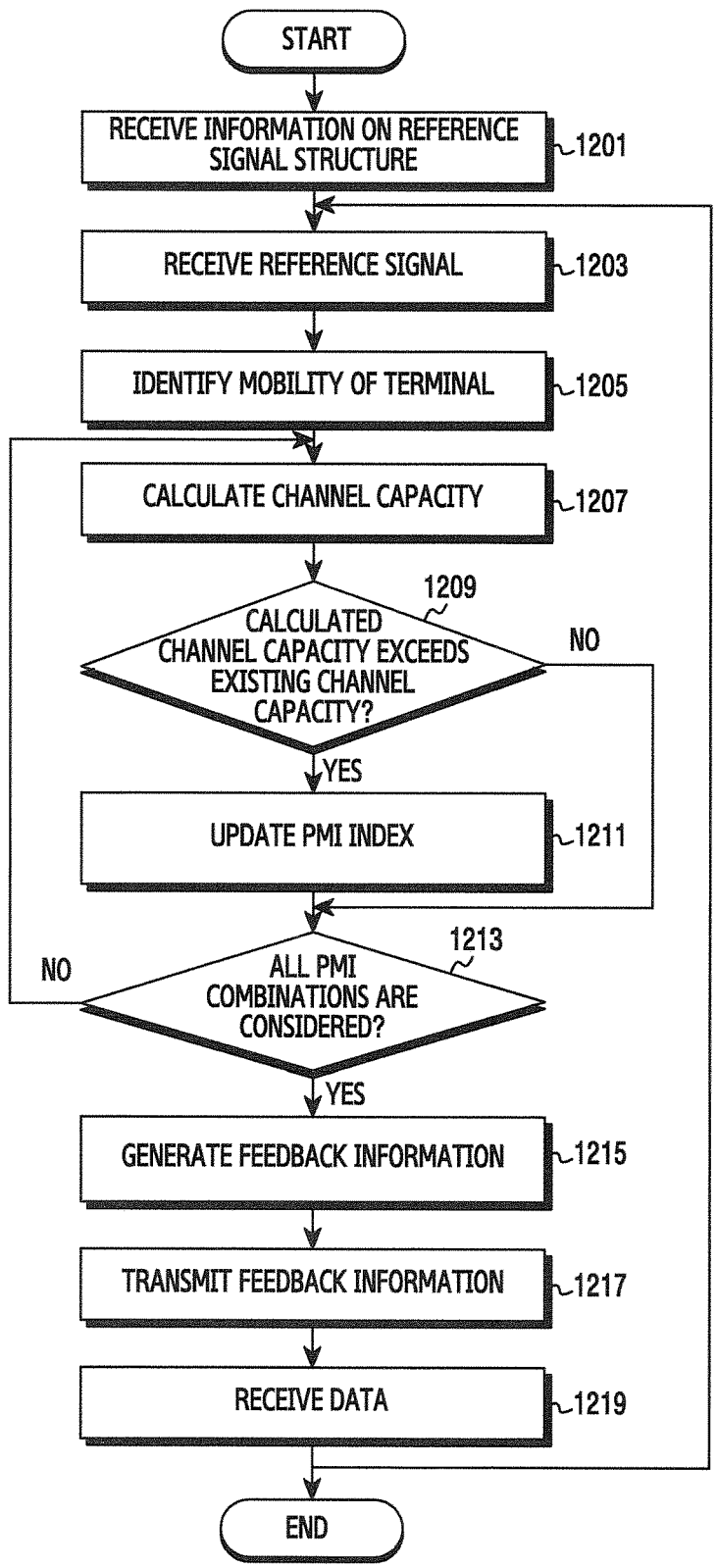
FIG. 12 illustrates a procedure for determining a feedback information size according to the mobility of a terminal in a wireless communication system according to an embodiment of the present invention

FIG. 12 illustrates a procedure for determining a feedback information size according to the mobility of a terminal in a wireless communication system according to an embodiment of the present invention. FIG. 12 illustrates a method for a terminal to determine a vertical/horizontal PMI size based on directivity. FIG. 12 illustrates an operating method of the terminal 210.

Referring to FIG. 12, the terminal receives information on a reference signal structure from the base station in operation 1201. The information on the reference signal structure may include at least one of a vertical/horizontal reference signal structure, a feedback period of a vertical/horizontal reference signal, and PMI subset restriction information. The terminal may receive the information on the reference signal structure from the base station through an RRC signal.

The terminal receives a reference signal from the base station in operation 1203. The reference signal may include at least one of a horizontal reference signal and a vertical reference signal. The terminal may receive at least one of the horizontal reference signal and the vertical reference signal based on at least one of the horizontal reference signal structure and the vertical reference signal structure received from the base station.

The terminal identifies the mobility of the terminal in operation 1205. The mobility of the terminal may be determined by the terminal or may be determined by another entity (for example, the base station or the like) to be notified to the terminal. Accordingly, the terminal may determine whether the terminal frequently moves in the horizontal direction or frequently moves in the vertical direction. The terminal may determine a combination of vertical/horizontal PMI sizes based on the mobility of the terminal. For example, when the terminal has a higher mobility in the horizontal direction, the terminal may determine the size of the horizontal PMI to be greater than the size of the vertical PMI. On the contrary, when the terminal has a higher mobility in the vertical direction, the terminal may determine the size of the vertical PMI to be greater than the size of the horizontal PMI.

The terminal calculates channel capacity in operation 1207. The terminal may determine a combination of vertical/horizontal PMIs to maximize the channel capacity within the combination of the vertical/horizontal PMI sizes determined based on the mobility of the terminal. The terminal may determine the combination of vertical/horizontal PMIs to maximize the channel capacity by applying Equation 1 to the determined vertical/horizontal PMI sizes.

The terminal compares the calculated channel capacity with existing channel capacity in operation 1209. When the calculated channel capacity exceeds the existing channel capacity, the terminal may update the combination of vertical/horizontal PMIs to maximize the channel capacity to a PMI index in operation 1211. When the calculated channel capacity does not exceed the existing channel capacity, the terminal may identify whether all vertical/horizontal PMI combinations available for the terminal are substituted into Equation 1 with respect to the combination of the horizontal/vertical PMI sizes determined based on the mobility of the terminal in operation 1213. Further, when the calculated channel capacity does not exceed existing channel capacity, the terminal may not update the combination of the vertical/horizontal PMIs corresponding to the calculated channel capacity to the PMI index.

The terminal determines whether all PMIs are considered in operation 1213. The terminal may determine whether all selectable vertical/horizontal PMI combinations within the combination of the determined vertical/horizontal PMI sizes are applied to Equation 1.

The terminal generates feedback information in operation 1215. The feedback information may include at least one of the combination of the vertical/horizontal PMI sizes determined based on the mobility of the terminal and the combination of the vertical/horizontal PMIs to maximize the channel capacity. The feedback information may include a header indicating at least one of the vertical PMI size and the horizontal PMI size.

The terminal transmits the feedback information to the base station in operation 1217. The terminal may notify the base station of information on the combination of the vertical/horizontal PMI sizes through the header of the feedback information.

The terminal receives data transmitted from the base station in operation 1219. The base station may transmit data to the terminal based on the feedback information received from the terminal. The terminal may receive data transmitted from the base station.

When the terminal receives a next reference signal from the base station, the foregoing operations of the terminal may be repeated. According to another embodiment of the present invention, after transmitting the data from the base station, the terminal may end the foregoing procedure.

According to still another embodiment of the present invention, a vertical/horizontal PMI size may be determined based on an antenna configuration of a base station. In a 2D array structure of antennas, a PMI size may be determined depending on the numbers of antennas arranged on the horizontal axis and the vertical axis. Specifically, when the number of antenna rows is greater than the number of antenna columns, more bits may be assigned for a domain on the vertical axis, for which since beamforming may be more precisely performed with a greater number of antennas, more precise channel information is required. Thus, the base station may assign more PMI bits for a domain (for example, vertical or horizontal) where more antennas are arranged depending on the number of antennas disposed on the vertical axis or the horizontal axis. The base station may transmit information on a combination of vertical/horizontal PMI sizes to the terminal through an RRC signal. To this end, feedback configuration information as in Table 1 may be transmitted from the base station to the terminal.

Figure 13A:
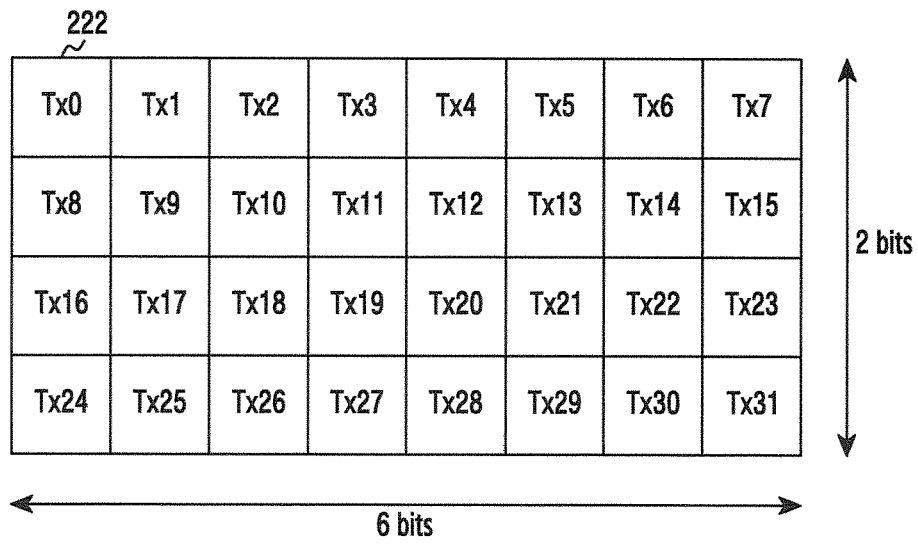
FIG. 13 illustrates an example of a feedback information size according to an antenna structure of a base station in a wireless communication system according to an embodiment of the present invention.
Figure 13B:
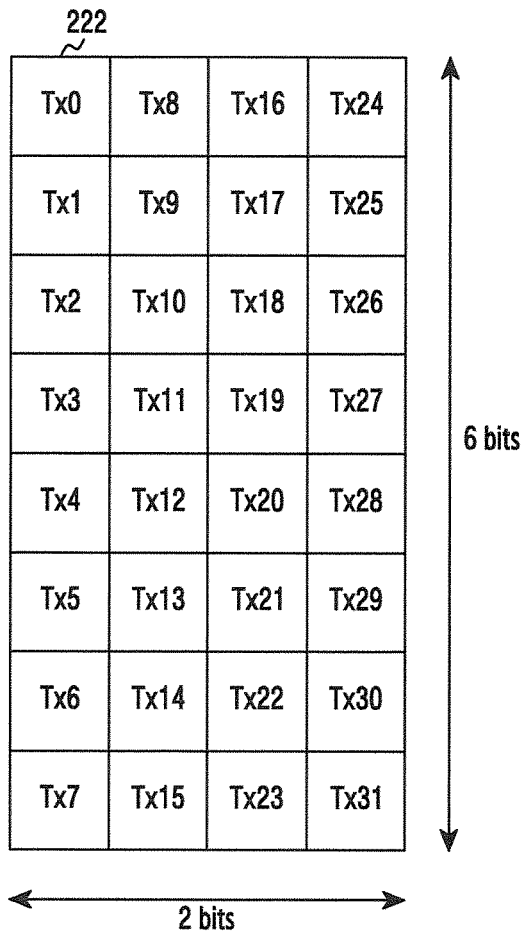

FIG. 13 illustrates an example of a feedback information size according to an antenna structure of a base station in a wireless communication system according to an embodiment of the present invention. Referring to FIG. 13, as in (a), when a greater number of antennas are arranged on the horizontal axis in an antenna array 222, more bits may be assigned to a horizontal PMI. In this case, since the terminal may transmit a more precise PMI on the horizontal axis, the base station may receive accurate feedback information on a horizontal reference signal. On the contrary, as in (b), when a greater number of antennas are arranged on the vertical axis in the antenna array 222, more bits may be assigned to a vertical PMI. In this case, since the terminal may transmit a more precise PMI on the vertical axis, the base station may receive accurate feedback information on a vertical reference signal.

As described above, the number of bits for a horizontal PMI and a vertical PMI may be determined depending on the number of antennas on each axis of the antenna array 222. Specifically, in (a), 6 bits may be assigned for feedback on a horizontal reference signal, and 2 bits may be assigned for feedback on a vertical reference signal. In (b), 2 bits may be assigned for feedback on a horizontal reference signal, and 6 bits may be assigned for feedback on a vertical reference signal.

Figure 14:
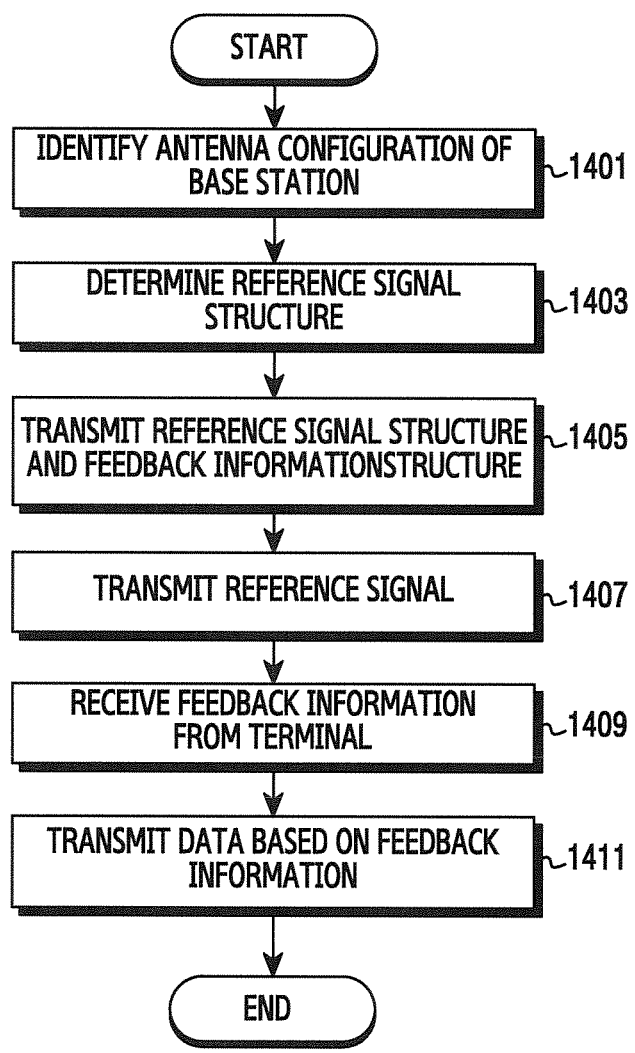
FIG. 14 illustrates a procedure for determining a feedback information size according to an antenna structure of a base station in a wireless communication system according to an embodiment of the present invention.

FIG. 14 illustrates a procedure for determining a feedback information size according to an antenna structure of a base station in a wireless communication system according to an embodiment of the present invention. FIG. 14 illustrates a method for the base station to determine a vertical/horizontal PMI size according to the antenna structure of the base station. FIG. 14 illustrates an operating method of the base station 220.

The base station identifies an antenna configuration of the base station in operation 1401. The base station may identify the antenna configuration including at least one of the type of a base station antenna, the arranged states of base station antennas, the height of a base station antenna, and the position of a base station antenna. In particular, the base station identifies the number of antennas on the vertical axis and the number of antennas on the horizontal axis, that is, the number of antenna columns and the number of antenna rows.

The base station determines a reference signal structure in operation 1403. The base station may determine the structure of a reference signal based on the antenna configuration. The structure may include the number of horizontal reference signals and the number of vertical reference signals. The base station may determine a combination of a horizontal PMI size and a vertical PMI size based on the antenna configuration of the base station. For example, when antennas of the base station are arranged in 10 columns in the vertical direction and in 5 rows in the horizontal direction, the base station may determine that the vertical PMI size is 10 bits and the horizontal PMI size is 5 bits.

The base station transmits the reference signal structure and the structure of the feedback information to the terminal in operation 1405. The base station may transmit, to the terminal, the determined reference signal structure including a horizontal reference signal structure and a vertical reference signal structure and the feedback information configuration indicating at least one of a feedback information transmission period and the combination of the vertical/horizontal PMI sizes. The base station may transmit the reference signal structure and the structure of the feedback information through an RRC signal. For example, the base station may transmit information as in Table 1.

The base station transmits the reference signal to the terminal in operation 1407. The base station may transmit at least one of the horizontal reference signal and the vertical reference signal to the terminal. The base station may transmit at least one of the horizontal reference signal and the vertical reference signal to the terminal according to the determined reference signal structure.

The base station receives feedback information from the terminal in operation 1409. The feedback information may include information on a combination of vertical/horizontal PMIs to maximize channel capacity determined by the terminal.

The base station transmits data to the terminal based on the feedback information received from the terminal in operation 1411. The base station may transmit data to the terminal based on the feedback information using the combination of the vertical/horizontal PMIs to maximize the channel capacity.

According to yet another embodiment of the present invention, a vertical/horizontal PMI size may be determined based on a signal transmitted from a terminal. The base station measures a channel with a terminal using a signal received from the terminal. For example, the signal may be referred to as a Sounding Reference Signal (hereinafter, 'SRS'). Accordingly, the base station may determine which domain (for example, vertical or horizontal) the terminal is more affected by and may determine a vertical/horizontal PMI size.

Figure 15:
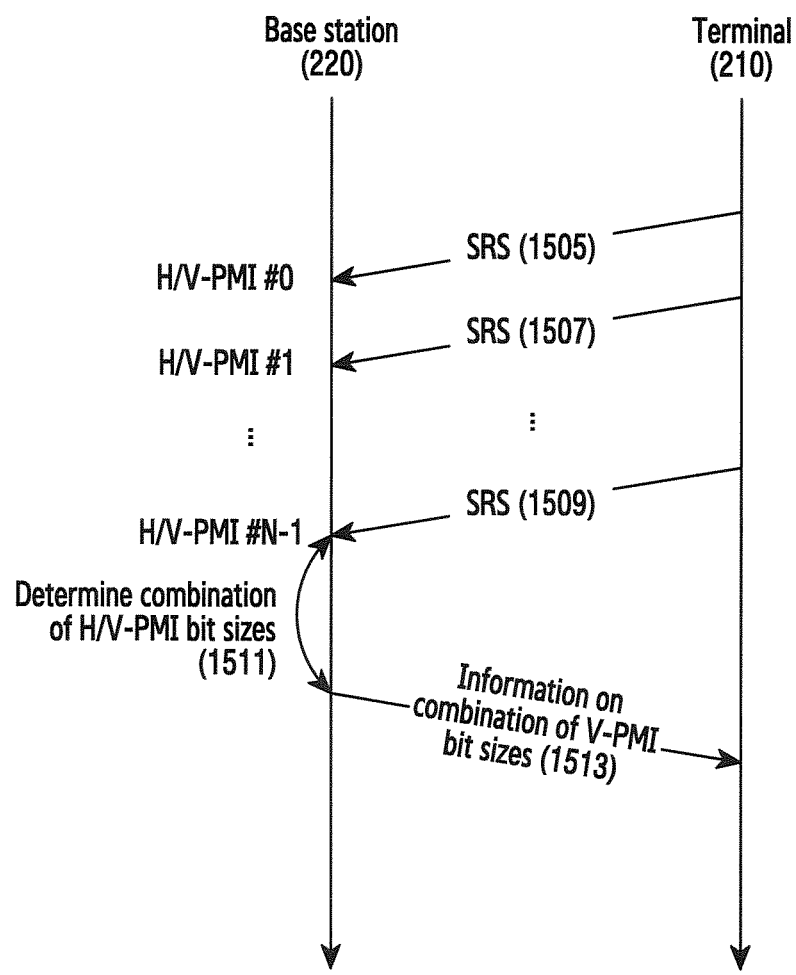
FIG. 15 illustrates a procedure for determining a feedback information size based on a Sounding Reference Signal (SRS) in a wireless communication system according to an embodiment of the present invention.

FIG. 15 illustrates a procedure for determining a feedback information size based on an SRS in a wireless communication system according to an embodiment of the present invention. Referring to FIG. 15, in operations 1505 to 1509, the base station 220 may receive SRSs from the terminal 210 through antenna rows transmitting a horizontal reference signal and antenna columns transmitting a vertical reference signals, respectively. The base station 220 may determine a combination of vertical/horizontal PMI sizes to be used by the terminal 210 based on channel information estimated through the SRSs. That is, the base station 220 may determine whether the terminal 210 is more affected by antennas on the horizontal axis or antennas on the vertical axis based on a signal transmitted from the terminal 210. The base station may determine a combination of vertical/horizontal PMI sizes available for the terminal according to the determination. In operation 1513, the base station 220 may transmit information on the determined combination of the vertical/horizontal PMI sizes to the terminal 210. For example, the base station 220 may transmit information as in Table 1.

Figure 16:
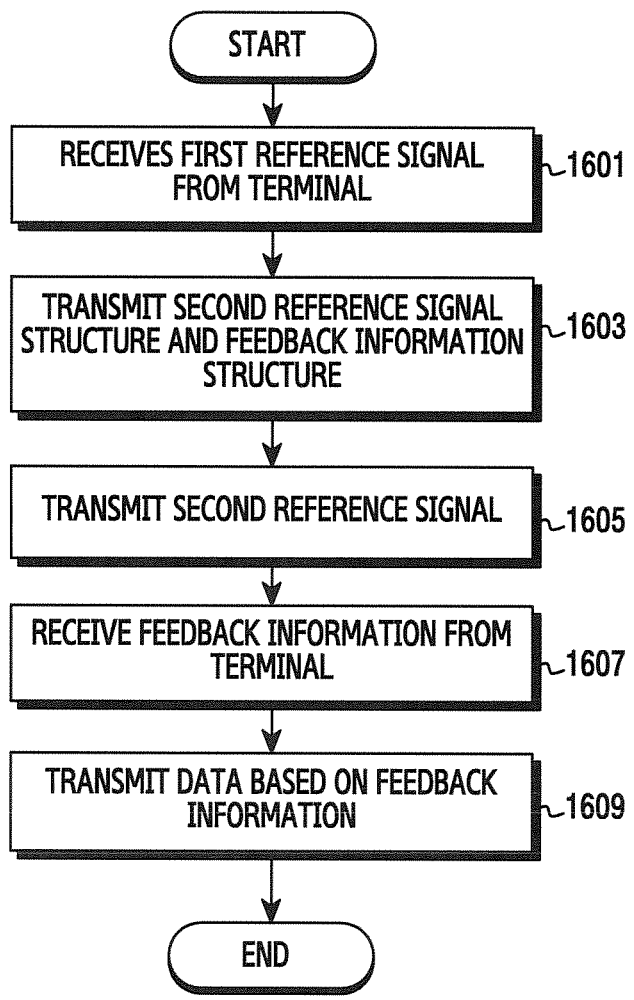
FIG. 16 illustrates a procedure for determining a feedback information size based on a signal from a terminal in a wireless communication system according to an embodiment of the present invention.

FIG. 16 illustrates a procedure for determining a feedback information size based on a signal from a terminal in a wireless communication system according to an embodiment of the present invention. FIG. 16 illustrates an operating method of the base station 220 for the procedure in FIG. 15.

Referring to FIG. 16, the base station receives a first reference signal from a terminal in operation 1601. The base station may determine, based on the first reference signal received from the terminal, which row or column of antennas the at least one terminal is more affected by among horizontally disposed antennas and vertically disposed antennas. The base station may determine at least one of the structure of a second reference signal to be transmitted to the terminal and a combination of vertical/horizontal PMI sizes to be used by the at least one terminal based on the first reference signal.

The base station transmits information on the structure of the second reference signal and the combination of the vertical/horizontal PMI sizes to the terminal in operation 1603. The base station may transmit, to the terminal, the information on the structure of the second reference signal to be transmitted to the at least one terminal and the combination of the vertical/horizontal PMI sizes to be used by the terminal, which are determined based on the first reference signal received from the at least one terminal.

The base station transmits the second reference signal to the terminal in operation 1605. The base station may transmit the second reference signal to the terminal according to the structure of the second reference signal.

The base station receives feedback information from the terminal in operation 1607. The feedback information may include information on an optimal combination of vertical/horizontal PMIs within a range of the combination of the vertical/horizontal PMI sizes determined by the base station. For example, the optimal combination of the vertical/horizontal PMIs may be determined based on channel capacity calculated by the terminal through Equation 1.

The base station transmits data to the terminal based on the feedback information received from the terminal in operation 1609. The base station may transmit data to the at least one terminal based on at least one of the combination of the vertical/horizontal PMI sizes and the information on the combination of the vertical/horizontal PMIs. That is, the base station may identify the vertical/horizontal PMIs from the feedback information based on the vertical/horizontal PMI sizes and may transmit a data signal precoded by the vertical/horizontal PMIs.

Figure 17:
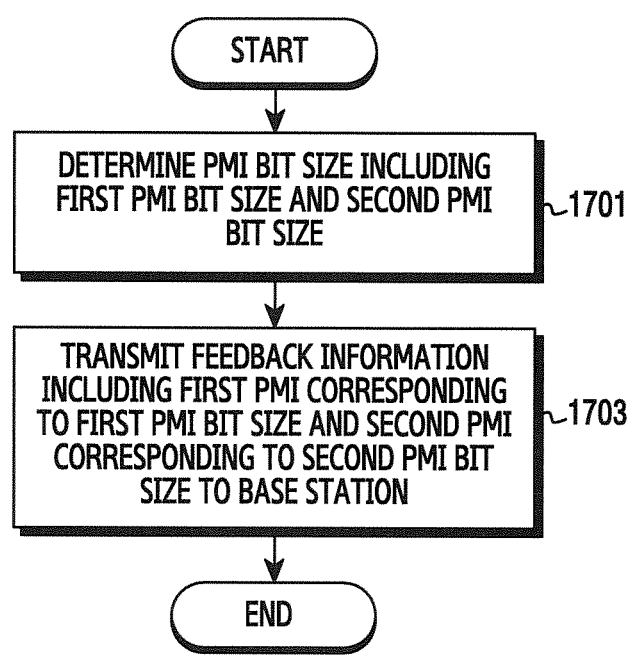
FIG. 17 illustrates an operating procedure of a terminal in a wireless communication system according to an embodiment of the present invention.

FIG. 17 illustrates an operating procedure of a terminal in a wireless communication system according to an embodiment of the present invention. FIG. 17 illustrates an operating method of the terminal 210.

Referring to FIG. 17, the terminal determines a PMI size including a first PMI size and a second PMI size in operation 1701. The terminal may receive at least one of a first reference signal and a second reference signal from a base station. The terminal may determine a PMI combination including a first PMI and a second PMI based on at least one of the first reference signal and the second reference signal. The terminal may determine the PMI size based on at least one of the first reference signal and the second reference signal. The terminal may determine the PMI size based on a horizontal or vertical mobility of the terminal. The terminal may assign more bits for a PMI in a domain having a more frequent transmission period than for a PMI in a domain having a less frequent transmission period based on a feedback transmission period received from the base station.

The terminal transmits feedback information including the first PMI corresponding to the first PMI size and the second PMI corresponding to the second PMI size to the base station in operation 1703. According to another embodiment of the present invention, the feedback information may further include a header to notify the base station of the PMI size. The terminal may transmit the PMI in the domain having the more frequent feedback transmission period to the base station in each period. The terminal may divide the PMI in the domain having the less frequent feedback transmission period into at least two or more and may transmit each divided part to the base station according to each feedback period.

Figure 18:
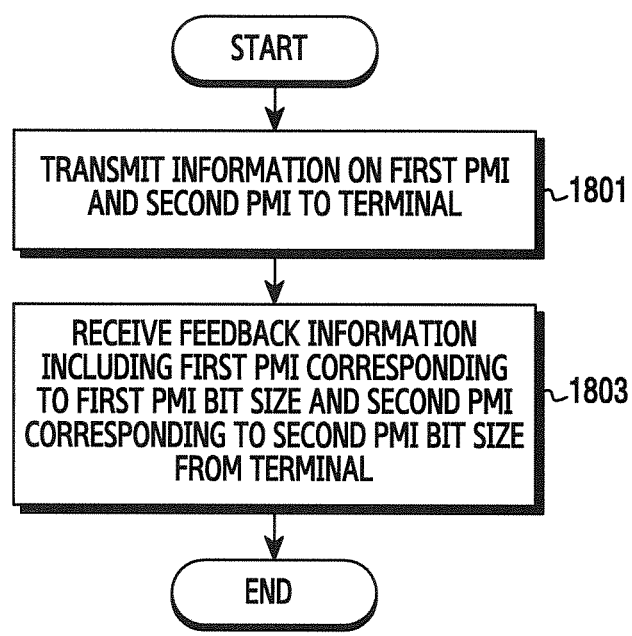
FIG. 18 illustrates an operating procedure of a base station in a wireless communication system according to an embodiment of the present invention.

FIG. 18 illustrates an operating procedure of a base station in a wireless communication system according to an embodiment of the present invention. FIG. 18 illustrates an operating method of the base station 220.

Referring to FIG. 18, the base station transmits information on a first PMI and a second PMI to a terminal in operation 1801. The base station may transmit information on selectable PMIs to the terminal.

The base station receives feedback information including a first PMI corresponding to a first PMI size and a second PMI corresponding to a second PMI size from the terminal in operation 1803. The feedback information may include a header to notify the base station of the first PMI size and the second PMI size that are determined by the terminal.

Figure 19:
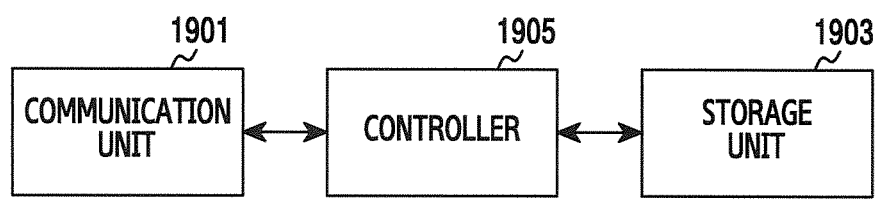
FIG. 19 is a block diagram illustrating a configuration of a terminal or a base station in a wireless communication system according to an embodiment of the present invention.

FIG. 19 is a block diagram illustrating a configuration of a terminal or a base station in a wireless communication system according to an embodiment of the present invention. FIG. 19 illustrates a configuration of the terminal 210 or the base station 220. The terms 'unit,' '-or/er,' and the like used herein indicate a unit for processing at least one function or operation, which may be implemented by hardware, software, or a combination thereof.

Referring to FIG. 19, the terminal or the base station includes a communication unit 1901, a storage unit 1903, and a controller 1905.

The communication unit 1901 performs functions of transmitting and receiving a wireless signal of data input and output through an antenna. For example, in transmission, the communication unit 1901 performs channel coding and radio frequency (RF) processing on data to transmit and transmits the data. In reception, the communication unit 1901 converts a received RF signal into a baseband signal and channel-decodes the baseband signal to reconstruct data. Although not shown in FIG. 19, when the device illustrated in FIG. 19 is a base station, the device may further include an antenna array 222. As described above, the communication unit 901 transmits and receives a signal. Accordingly, the communication unit 901 may be referred to as a transmitter, a receiver, or a transceiver. Further, in the following description, a transmission and a reception performed via a radio channel include the foregoing processes performed by the communication unit 901.

When the device illustrated in FIG. 19 is the terminal, the communication unit 1901 may transmit feedback information including a first PMI corresponding to a first PMI size and a second PMI corresponding to a second PMI size to a base station according to the embodiment of the present invention, in addition to performing general functions. The feedback information may include a header to notify the base station of the PMI sizes. The communication unit 1901 may receive at least one of a first reference signal and a second reference signal from the base station. The communication unit 1901 may receive, from the base station, information on a PMI size including a first PMI size and a second PMI size determined by the base station. The communication unit 1901 may transmit a PMI in a domain having a more frequent feedback transmission period to the base station in each period. The communication unit 1901 may divide a PMI in a domain having a less frequent feedback transmission period into at least two or more and may transmit each divided part to the base station according to each feedback period.

When the device illustrated in FIG. 19 is the base station, the communication unit 1901 may transmit information on a first PMI and a second PMI to a terminal. The communication unit 1901 may receive, from the terminal, feedback information including a first PMI corresponding to a first PMI size and a second PMI corresponding to a second PMI size. The feedback information may include a header to notify the base station of the first PMI size and the second PMI size that are determined by the terminal. The communication unit 1901 may transmit at least one of a first reference signal and a second reference signal to the terminal based on antenna information on the base station. The antenna information may include at least one of the type of the base station, the types of antennas of the base station, the arranged states of the antennas of the base station, the heights of the antennas of the base station, and the positions of the antennas of the base station. The communication unit 1901 may transmit information on the PMI sizes to the base station.

The storage unit 1903 stores a micro-code of a program for processing and control by the controller 1905 and various kinds of reference data. In particular, according to the embodiment of the present invention, the storage unit 1903 may store at least one of the feedback information and the antenna information.

The controller 1905 controls overall operations of the control device. For example, the controller 1905 performs processing and control for voice communication and data communication. When the device illustrated in FIG. 19 is the terminal, the controller 1905 may determine a PMI size including the first PMI size and the second PMI size according to the embodiment of the present invention, in addition to performing general functions. The controller 1905 may determine a PMI combination including the first PMI and the second PMI based on at least one of the first reference signal and the second reference signal. The controller 1905 may determine the PMI size based on at least one of the first reference signal and the second reference signal. The controller 1905 may determine the PMI size based on a horizontal or vertical mobility of the terminal. The controller 1905 may assign more bits for a PMI in a domain having a more frequent transmission period than for a PMI in a domain having a less frequent transmission period based on a feedback transmission period received from the base station.

When the device illustrated in FIG. 19 is the base station, the controller 1905 may determine a PMI size including a first PMI size and a second PMI size based on at least one of the antenna information, the distance between the base station and the terminal, and a plurality of reference signals received from the terminal according to another embodiment of the present invention.

Figure 20:
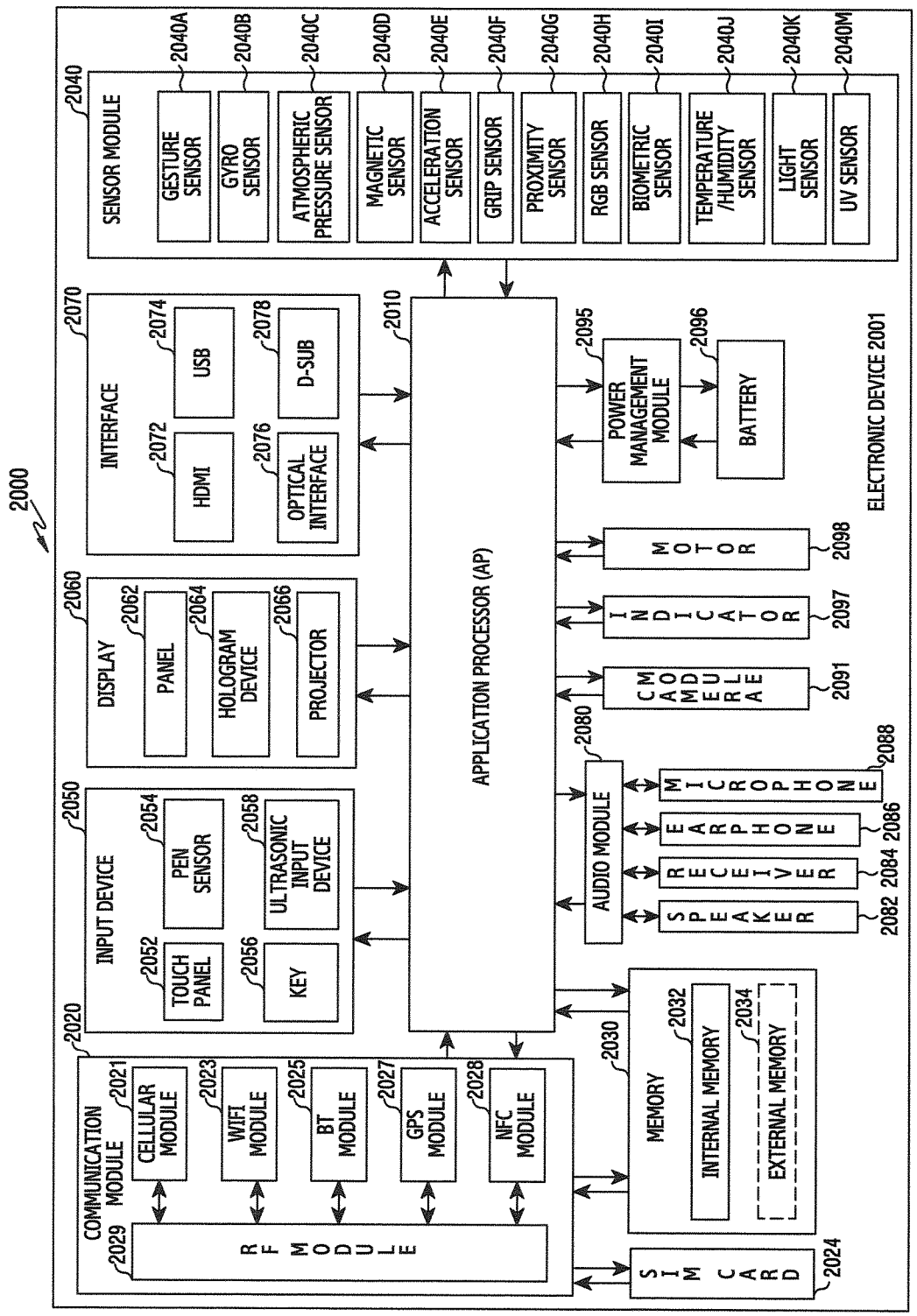
FIG. 20 is a block diagram illustrating a configuration of a terminal in a wireless communication system according to an embodiment of the present invention.

FIG. 20 is a block diagram illustrating a configuration of a terminal in a wireless communication system according to an embodiment of the present invention.

Referring to FIG. 20, an electronic device 2001 may include one or more application processors (APs) 2010, a communication module 2020, a subscriber identification module (SIM) card 2024, a memory 2030, a sensor module 2040, an input device 2050, a display 2060, an interface 2070, an audio module 2080, a camera module 2091, a power management module 2095, a battery 2096, an indicator 2097, and a motor 2098.

The APs 2010 may run an operating system or an application program to control a plurality of hardware or software components that are connected to the APs 2010 and may perform processing of various kinds of data including multimedia data and operations. The APs 2010 may be configured, for example, as a system on chip (SoC). According to one embodiment, the APs 2010 may further include a graphic processing unit (GPU).

According to the embodiment of the present invention, the APs 2010 may determine a PMI size including a first PMI size and a second PMI size, in addition to performing general functions. The APs 2010 may determine a PMI combination including a first PMI and a second PMI based on at least one of a first reference signal and a second reference signal. The APs 2010 may determine the PMI size based on at least one of the first reference signal and the second reference signal. The APs 2010 may determine the PMI size based on a horizontal or vertical mobility of the terminal. The APs 2010 may assign more bits for a PMI in a domain having a more frequent transmission period than for a PMI in a domain having a less frequent transmission period based on a feedback transmission period received from the base station.

The communication module 2020 may transmit and receive data in communications between the electronic device 2001 and other electronic devices connected through a network. According to one embodiment, the communication module 2020 may include a cellular module 2021, a Wi-Fi module 2023, a BT module 2025, a GPS module 2027, an NFC module 2028, and a radio frequency (RF) module 2029.

The cellular module 2021 may provide a voice call, a video call, a text messaging service, or an Internet service through a communication network (for example, LTE, LTE-A, CDMA, WCDMA, UMTS, WiBro, GSM, or the like). Further, the cellular module 2021 may perform identification and authentication of an electronic device in a communication network, for example, using an SIM (for example, the SIM card 2024). According to one embodiment, the cellular module 2021 may perform at least part of the functions provided by the APs 2010. For example, the cellular module 2021 may perform at least part of a multimedia control function.

According to one embodiment, the cellular module 2021 may include a communication processor (CP). Further, the cellular module 2021 may be configured, for example, as an SoC. FIG. 20 shows that components, such as the cellular module 2021 (for example, the CP), the memory 2030, or the power management module 2095, are separate components from the APs 2010. According to one embodiment, however, the APs 2010 may be configured to include at least part (for example, the cellular module 2021) of the foregoing components.

According to one embodiment, the APs 2010 or the cellular module 2021 (for example, the CP) may load a command or data, which is received from a nonvolatile memory connected to each of the APs 2010 or the cellular module 2021, or from at least one of other components, into a volatile memory to process the command or data. The APs 2010 or the cellular module 2021 may store data, which is received from or generated by at least one of other components, in the nonvolatile memory.

The Wi-Fi module 2023, the BT module 2025, the GPS module 2027, and the NFC module 2028 may each include a processor to process data that is transmitted and received, for example, via the respective modules. In FIG. 20, the cellular module 2021, the Wi-Fi module 2023, the BT module 2025, the GPS module 2027, and the NFC module 2028 are shown in separate blocks, respectively. According to one embodiment, however, at least part (for example, two or more) of the cellular module 2021, the Wi-Fi module 2023, the BT module 2025, the GPS module 2027, and the NFC module 2028 may be included in one integrated chip (IC) or IC package. For example, at least part (for example, the CP corresponding to the cellular module 2021 and a Wi-Fi processor corresponding to the Wi-Fi module 2023) of processors respectively corresponding to the cellular module 2021, the Wi-Fi module 2023, the BT module 2025, the GPS module 2027, and the NFC module 2028 may be configured as one SoC.

The RF module 2029 may transmit and receive data, for example, an RF signal. The RF module 2029 may include, for example, although not shown, a transceiver, a power amplifier module (PAM), a frequency filter, a low noise amplifier (LNA), or the like. Further, the RF module 2029 may further include a component for transmitting and receiving electromagnetic waves in the free space in wireless communication, for example, a conductor, a conducting wire, or the like. FIG. 20 shows that the cellular module 2021, the Wi-Fi module 2023, the BT module 2025, the GPS module 2027, and the NFC module 2028 share one RF module 2029. According to one embodiment, however, at least one of the cellular module 2021, the Wi-Fi module 2023, the BT module 2025, the GPS module 2027, and the NFC module 2028 may transmit and receive an RF signal through a separate RF module.

According to the embodiment of the present invention, the communication module 2020 may transmit feedback information including a first PMI corresponding to a first PMI size and a second PMI corresponding to a second PMI size to a base station, in addition to performing general functions. The feedback information may include a header to notify the base station of the PMI sizes. The communication module 2020 may receive at least one of a first reference signal and a second reference signal from the base station.

The communication module 2020 may receive, from the base station, information on a PMI size including a first PMI size and a second PMI size determined by the base station. The communication module 2020 may transmit a PMI in a domain having a more frequent feedback transmission period to the base station in each period. The communication module 2020 may divide a PMI in a domain having a less frequent feedback transmission period into at least two or more and may transmit each divided part to the base station according to each feedback period.

The SIM card 2024 may be a card including an SIM and may be inserted into a slot formed at a specific position of the electronic device. The SIM card 2024 may include unique identification information (for example, an integrated circuit card identifier (ICCID)) or subscriber information (for example, an international mobile subscriber identity (IMSI)).

The memory 2030 may include an internal memory 2032 or an external memory 2034. The internal memory 2032 may include, for example, at least one of a volatile memory (for example, a dynamic random-access memory (DRAM), a static RAM (SRAM), a synchronous dynamic RAM (SDRAM), or the like) and a nonvolatile memory (for example, a one-time programmable read-only memory (OTPROM), a programmable ROM (PROM), an erasable and programmable ROM (EPROM), an electrically erasable and programmable ROM (EEPROM), a mask ROM, a flash ROM, an NAND flash memory, an NOR flash memory, or the like).

According to one embodiment, the internal memory 2032 may be a solid state drive (SSD). The external memory 2034 may further include a flash drive, for example, a compact flash (CF), a secure digital (SD), a micro secure digital (micro-SD), a mini secure digital (mini-SD), an extreme digital (xD), a memory stick, or the like. The external memory 2034 may be functionally connected to the electronic device 2001 through various interfaces. According to one embodiment, the electronic device 2001 may further include a storage device (or storage medium), such as a hard drive. The memory 2030 according to the embodiment of the present invention may store at least one of the type of one of the other electronic devices, a supportable communication mode, a function, a model name, an ID, and a phone number.

The memory 2030 according to the embodiment of the present invention may store at least one of the feedback information and the antenna information.

The sensor module 2040 may measure physical quantities or detect an operation state of the electronic device 2001 and convert measured or detected information into an electrical signal. The sensor module 2040 may include, for example, at least one of a gesture sensor 2040A, a gyro sensor 2040B, a barometric pressure sensor 2040C, a magnetic sensor 2040D, an accelerometer 2040E, a grip sensor 2040F, a proximity sensor 2040G, a color sensor 2040H (for example, a red, green, and blue (RGB) sensor), a biometric sensor 2040I, a temperature/humidity sensor 2040J, an illumination sensor 2040K, and an ultraviolet (UV) sensor 2040M. Additionally or alternatively, the sensor module 2040 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor, or the like. The sensor module 2040 may further include a control circuit to control at least one or more sensors belonging thereto.

The input device 2050 may include a touch panel 2052, a (digital) pen sensor 2054, a key 2056, or an ultrasonic input device 2058. The touch panel 2052 may recognize a touch input, for example using at least one of an electrostatic type, a pressure-sensitive type, an infrared type, and an ultrasonic type. Further, the touch panel 2052 may further include a control circuit. When the touch panel 2052 is an electrostatic type, a physical contact or proximity recognition is possible. The touch panel 2052 may further include a tactile layer. In this case, the touch panel 2052 may provide a user with a tactile response. The touch panel 2052 according to the embodiment of the present invention may recognize the occurrence of a touch input.

The (digital) pen sensor 2054 may be implemented, for example, by a method that is the same as, or similar to, receiving a touch input from a user or using a separate recognition sheet. The key 2056 may include, for example, a physical button, an optical key, or a keypad. The ultrasonic input device 2058 is a device that detects sound waves through an input tool, which generates an ultrasonic signal, using a microphone (for example, a microphone 2088) of the electronic device 2001 and identifies data and may achieve radio recognition. According to one embodiment, the electronic device 2001 may receive a user input from an external device connected thereto (for example, a computer or server) using the communication module 2020.

The display 2060 may include a panel 2062, a hologram device 2064, or a projector 2066. The panel 2062 may be, for example, a liquid crystal display (LCD), an active-matrix organic light-emitting diode (AM-OLED), or the like. The panel 2062 may be configured, for example, to be flexible, transparent, or wearable. The panel 2062 may be formed with the touch panel 2052 in a single module. The hologram device 2064 may display a three-dimensional image in the air using the interference of light. The projector 2066 may project light onto a screen to display an image. The screen may be disposed, for example, inside or outside the electronic device 2001. According to one embodiment, the display 2060 may further include a control circuit to control the panel 2062, the hologram device 2064, or the projector 2066.

The interface 2070 may include, for example, a high-definition multimedia interface (HDMI) 2072, a universal serial bus (USB) 2074, an optical interface 2076, or a D-subminiature (D-sub) 2078. Additionally or alternatively, the interface 2070 may include, for example, a mobile high-definition link (MHL) interface, an SD card/Multi-Media Card (MMC) interface, or an Infrared Data Association (IrDA) interface.

The audio module 2080 may convert a sound and an electrical signal reciprocally. The audio module 2080 may process sound information input or output, for example, through a speaker 2082, a receiver 2084, earphones 2086, or the microphone 2088.

The camera module 2091 is a device that takes a still image and a video. According to one embodiment, the camera module 2091 may include one or more image sensors (for example, a front sensor or a rear sensor), a lens, an image signal processor (ISP), or a flash (for example, an LED, a xenon lamp, or the like).

The power management module 2095 may manage the power of the electronic device 2001. Although not shown, the power management module 2095 may include, for example, a power management integrated circuit (PMIC), a charger integrated circuit (IC), or a battery or fuel gauge.

The PMIC may be mounted, for example, in an IC or SoC semiconductor. Charging methods may be divided into cable and wireless charging methods. The charger IC may charge a battery and may prevent overvoltage or overcurrent flow from a charger. According to one embodiment, the charger IC may include a charger IC for at least one of a cable charging method and a wireless charging method. The wireless charging method may include, for example, a magnetic resonance method, a magnetic induction method, or an electromagnetic wave method, and an additional circuit for wireless charging, such as a coil loop, a resonance circuit, or a rectifier, may be added.

The battery gauge may measure, for example, the remaining battery charge, the charging voltage, the current, or the temperature of the battery 2096. The battery 2096 may store or generate electricity and may supply power to the electronic device 2001 using the stored or generated electricity. The battery 2096 may include, for example, a rechargeable battery or a solar battery.

The indicator 2097 may display a specific state of the electronic device 2001 or a component thereof (for example, the APs 2010), for example, a booting state, a message state, or a charging state. The motor 2098 may convert an electrical signal into mechanical vibrations. Although not shown, the electronic device 2001 may include a processing device for supporting a mobile TV (for example, a GPU). The processing device for supporting the mobile TV may process media data in accordance with digital multimedia broadcasting (DMB), digital video broadcasting (DVB), or Media Flow standards.

The above described components of the electronic device according to various embodiments of the present invention may be formed of one or more components, and a name of a corresponding component element may be changed based on the type of electronic device. The electronic device according to the present invention may include one or more of the aforementioned components or may further include other additional components, or some of the aforementioned components may be omitted. Further, some of the components of the electronic device according to the various embodiments of the present invention may be combined to form a single entity, and thus, may equivalently execute functions of the corresponding elements prior to the combination.

As described above, a terminal according to an embodiment of the present invention transmits feedback information including a horizontal PMI and a vertical PMI according to a horizontal PMI size and a vertical PMI size that are determined by the terminal or a base station. Here, each of the horizontal PMI and the vertical PMI may be one value indicating one precoding matrix. Alternatively, each of the horizontal PMI and the vertical PMI may include a combination of a plurality of values indicating one precoding matrix.

For example, a mode of indicating one precoding matrix using two values may be referred to as 'dual codebook feedback.' In this case, one precoding matrix is indicated by a combination of a first indicator and a second indicator. The first indicator shows wideband or long-term channel properties and indicates a range of precoding matrices. Specifically, the first indicator may indicate a matrix reflecting a geometrically actual channel and a similar channel thereto. For example, the first indicator may be subjected to 1-bit oversampling in view of one-dimensional PMI fluctuation. The second indicator shows frequency-selective or short-term channel properties and specifies at least one precoding matrix among the range of precoding matrices indicated by the first indicator. For example, the second indicator may be used to select the most suitable precoding matrix among the precoding matrices indicated by the first indicator or to adjust a phase difference between different antenna groups.

Figure 21:
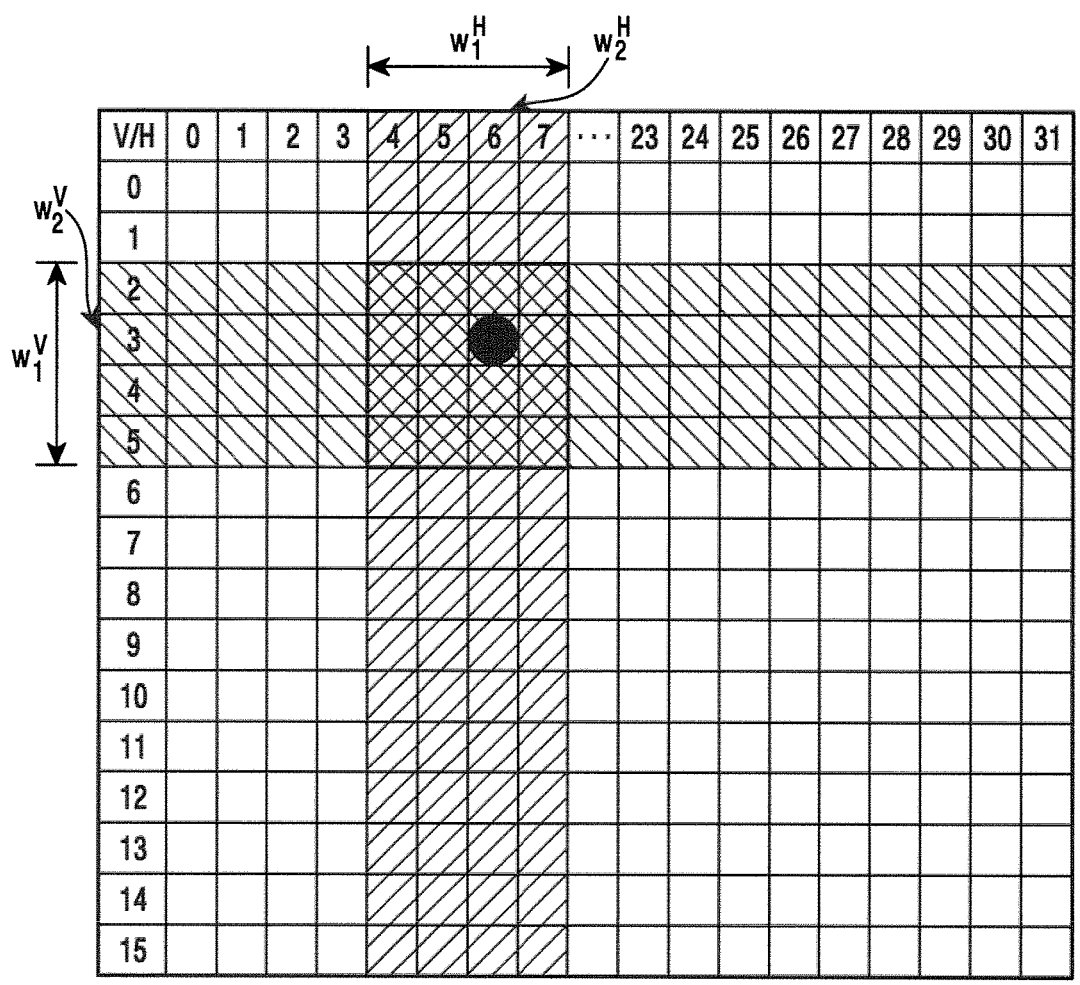
FIG. 21 illustrates a Precoding Matrix Indicator (hereinafter, 'PMI') structure in a wireless communication system according to an embodiment of the present invention.

The first indicator may be referred to as '$w_1$,' and the second indicator may be referred to as '$w_2$.' When vertical/horizontal PMIs are indicated through a plurality of values, PMIs may be configured as in FIG. 21.

FIG. 21 illustrates a PMI structure in a wireless communication system according to an embodiment of the present invention. FIG. 21 illustrates that PMI #6 is indicated as a horizontal PMI and PMI #3 is indicated as a vertical PMI in an environment where 32 horizontal PMIs and 16 vertical PMIs are available. Referring to FIG. 21, $w^H_1$ of horizontal PMIs indicates PMIs #4 to #7, and $w^V_1$ of vertical PMIs indicates PMIs #2 to #5. Further, $w^H_2$ of a horizontal PMI indicates PMI #6, and $w^V_1$ of a vertical PMI indicates PMI #3. In this case, although a PMI is changed, if the PMI is changed within a range in which a horizontal PMI or a vertical PMI is indicated by $w^H_1$ or $w^V_1$, $w^H_1$ or $w^V_1$ may not need to be fed back again, thus reducing overheads.

Figure 22A:
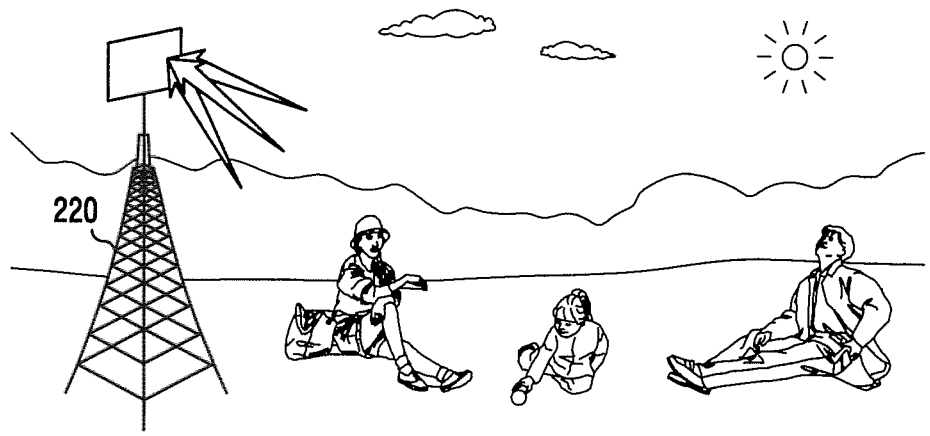
FIG. 22 illustrates an example of surroundings of a base station in a wireless communication system according to an embodiment of the present invention.
Figure 22B:
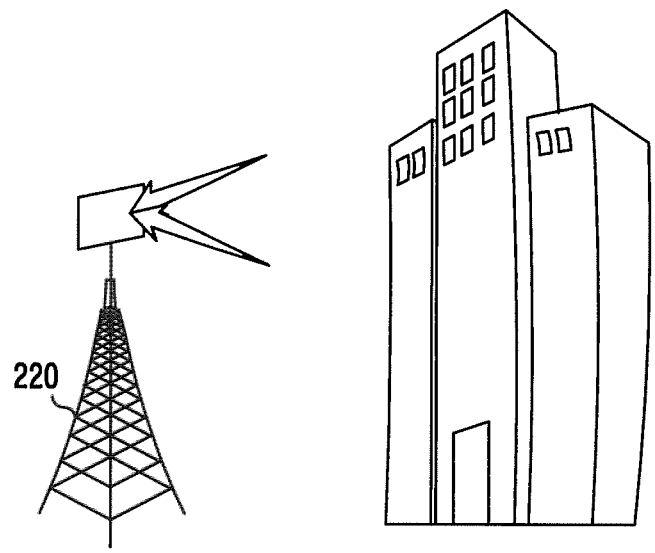

FIG. 22 illustrates an example of surroundings of a base station in a wireless communication system according to an embodiment of the present invention. In FIG. 22, (a) illustrates that the base station 220 is installed in an environment that facilitates horizontal movements of users, and (b) illustrates that the base station 220 is installed in an environment that facilitates vertical movements of users. For example, (a) may be an outdoor environment having no obstacle, in which it is possible to improve beamforming performance due to the directional accuracy of a horizontal beam. That is, in (a), the effect of a horizontal beam is dominant. Further, (b) may be an environment surrounded by buildings, in which it is possible to improve beamforming performance due to the directional accuracy of a vertical beam. That is, in (b), the effect of a vertical beam is dominant.

Thus, according to the various embodiments of the present invention described above, the base station and the terminal may properly adjust a vertical PMI size and a horizontal PMI size, thereby improving performance. Here, adjusting the vertical PMI size and the horizontal PMI size means restricting candidate PMIs. According to an embodiment of the present invention, candidates PMIs may be restricted using a PMI block illustrated below in FIG. 23.

Figure 23:
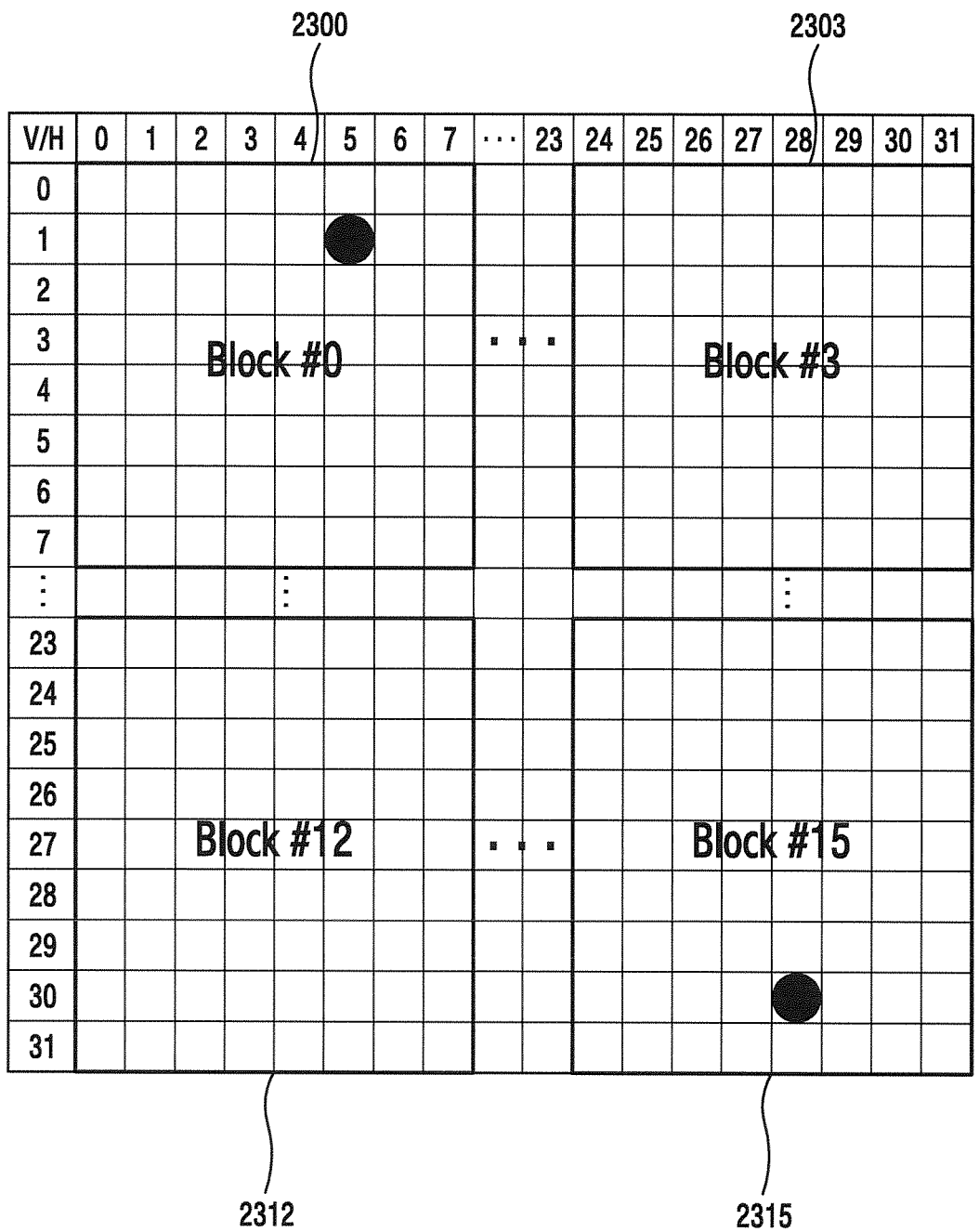
FIG. 23 illustrates the blocking of PMIs in a wireless communication system according to an embodiment of the present invention.

FIG. 23 illustrates the blocking of PMIs in a wireless communication system according to an embodiment of the present invention. FIG. 23 illustrates an environment in which 32 horizontal PMIs and 32 vertical PMIs are available. Referring to FIG. 23, the PMIs may be divided into 16 blocks. For example, Block #0 2300 includes horizontal PMIs #0 to #7 and vertical PMIs #0 to #7; block #3 2303 includes horizontal PMIs #24 to #31 and vertical PMIs #0 to #7; block #12 2312 includes horizontal PMIs #0 to #7 and vertical PMIs #23 to #31; and block #15 2315 includes horizontal PMIs #23 to #31 and vertical PMIs #23 to #31. Therefore, PMIs selectable between a base station and a terminal may be restricted by indicating the index of a block. Using the index of a block, PMI feedback may be performed as below in FIG. 24.

Figure 24:
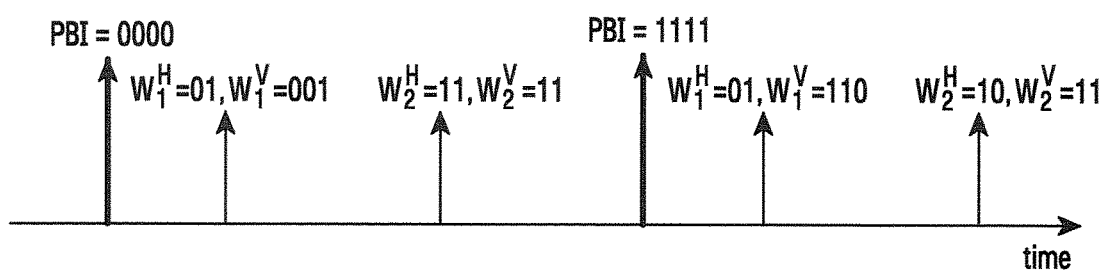
FIG. 24 illustrates a PMI feedback process in a wireless communication system according to an embodiment of the present invention.

FIG. 24 illustrates a PMI feedback process in a wireless communication system according to an embodiment of the present invention. Referring to FIG. 24, before a terminal feeds back a PMI to a base station, the terminal first feeds back information on a block to which the PMI to feed back belongs, that is, a PMI block indicator (hereinafter, 'PBI'). Subsequently, the terminal feeds back PMIs, that is, $w^H_1$, $w^V_1$, $w^H_2$, and $w^V_2$. Likewise, at a next feedback time, the terminal may feed back a PBI and may feed back PMIs, that is, $w^H_1$, $w^V_1$, $w^H_2$, and $w^V_2$. Here, although not shown in FIG. 24, the terminal may feed back an RI, a CQI, or the like along with the PMI.

The PBI and the PMIs may be transmitted together through a single message or may be transmitted separately through different messages. Further, $w^H_1$ and $w^V_1$ as a first indicator may be transmitted at different times from, or at the same time as, $w^H_2$ and $w^V_1$ as a second indicator. For example, the terminal may transmit the PBI through an uplink shared channel and may transmit at least one of the PMI, the RI, and the CQI through an uplink control channel. For example, the uplink shared channel may be referred to as a 'Physical Uplink Shared Channel (PUSCH),' and the uplink control channel may be referred to as a 'Physical Uplink Control Channel (PUCCH).'

As described with reference to FIG. 24, the terminal transmits information on a specific PMI block to which a PMI to feed back belongs to the base station. Here, PMI blocks may be defined variously according to specific embodiments. PMI blocks may be determined based on a channel environment, characteristics of an environment in which the base station is installed, the distance from a terminal, or the like.

Figure 25:
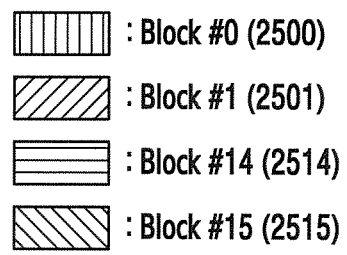
FIG. 25 illustrates an example of PMI blocks for an environment in which a vertical effect is significant in a wireless communication system according to an embodiment of the present invention.

FIG. 25 illustrates an example of PMI blocks for an environment in which a vertical effect is significant in a wireless communication system according to an embodiment of the present invention. When the vertical effect is significant, more detailed channel information in the vertical direction is required. Thus, all blocks, such as block #0 2500, block #1 2501, . . . , block #14 2514, and block #15 2515, include all vertical PMIs and some horizontal PMIs. That is, as illustrated in FIG. 25, when a base station receives a significant effect in the vertical direction (for example, a building area), each block may be defined in a rectangular shape with the length greater than the width thereof in order to feed back more accurate channel information to the base station. In this case, more bits are assigned for a vertical PMI than for a horizontal PMI.

Figure 26:
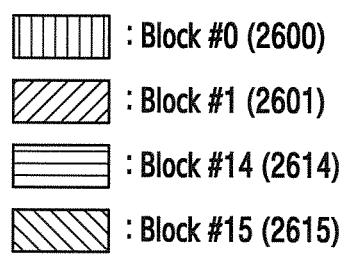
FIG. 26 illustrates an example of PMI blocks for an environment in which a horizontal effect is significant in a wireless communication system according to an embodiment of the present invention.

FIG. 26 illustrates an example of PMI blocks for an environment in which a horizontal effect is significant in a wireless communication system according to an embodiment of the present invention. When the horizontal effect is significant, more detailed channel information in the horizontal direction is required. Thus, all blocks, such as block #0 2600, block #1 2601, . . . , block #14 2614, and block #15 2615, include all horizontal PMIs and some vertical PMIs. That is, as illustrated in FIG. 26, when a base station receives a significant effect in the vertical direction (for example, a park or a residential area), each block may be defined in a rectangular shape with the width greater than the length thereof in order to feed back more accurate channel information to the base station. In this case, more bits are assigned for a horizontal PMI than for a vertical PMI.

Figures 27A, 27B:
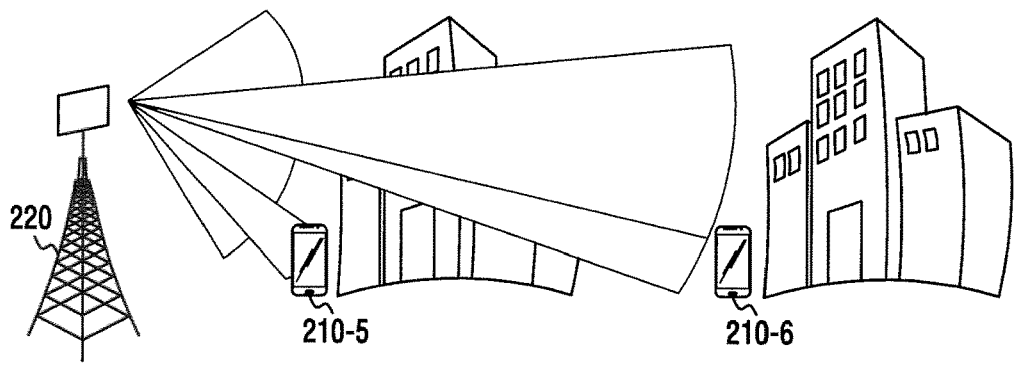
FIG. 27 illustrates an example of PMI blocks in view of a distance change in a wireless communication system according to an embodiment of the present invention.

FIG. 27 illustrates an example of PMI blocks in view of a distance change in a wireless communication system according to an embodiment of the present invention. As illustrated in (a) of FIG. 27, the number of necessary PMIs may change depending on the distance from the base station 220 to a terminal. That is, as the distance increases, the number of necessary PMIs to represent a channel decreases. For example, a first terminal 210-5 needs a greater number of PMIs than a second terminal 210-6 to represent a channel. Thus, as in (b), block #0 2700, block #1 2701, and block #2 2702 may be defined to include different numbers of horizontal PMIs.

Figure 28:
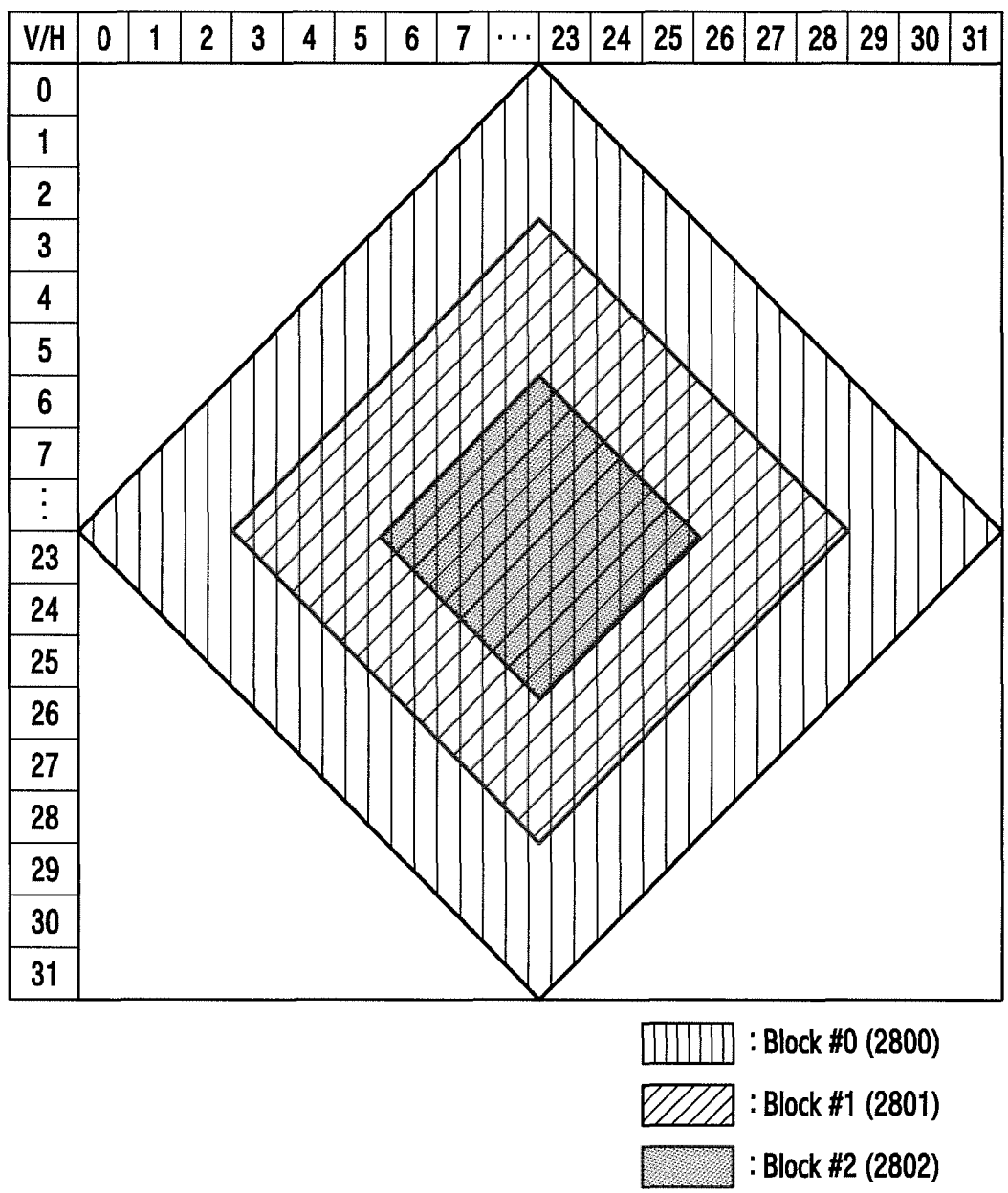
FIG. 28 illustrates an example of PMI blocks for PMI restriction in a wireless communication system according to an embodiment of the present invention.

FIG. 28 illustrates an example of PMI blocks for PMI restriction in a wireless communication system according to an embodiment of the present invention. As illustrated in FIG. 28, blocks including block #0 2800, block #1 2801, block #2 2802, and the like may be defined with diamond shapes having the same center.

Figure 29:
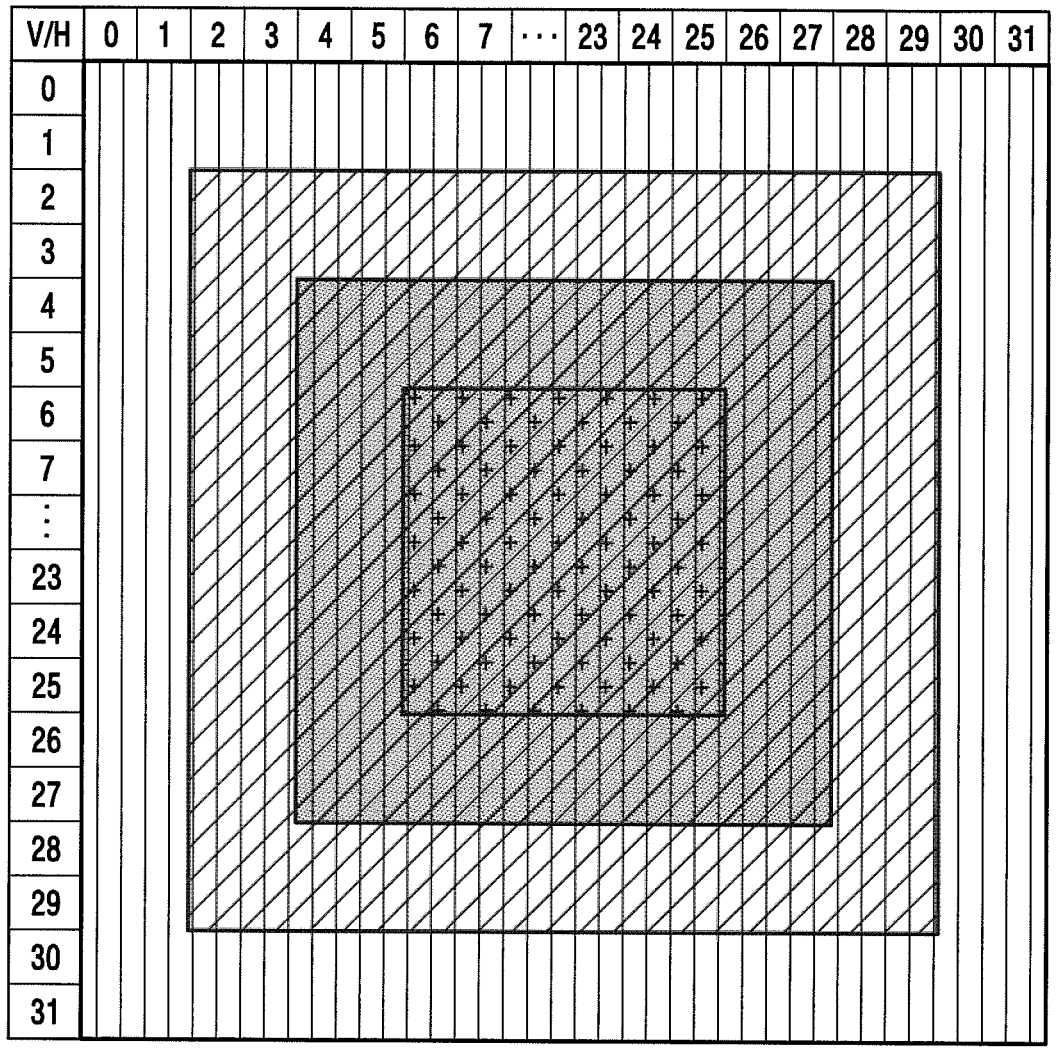
FIG. 29 illustrates another example of PMI blocks for PMI restriction in a wireless communication system according to an embodiment of the present invention.

FIG. 29 illustrates another example of PMI blocks for PMI restriction in a wireless communication system according to an embodiment of the present invention. As illustrated in FIG. 29, blocks including block #0 2900, block #1 2901, block #2 2902, and the like may be defined with squares having the same center.

When blocks are defined as described above, the base station and the terminal may share information on a configuration of blocks in advance and may exchange block indices, thereby restricting selectable PMIs and determining a vertical PMI size and a horizontal PMI size. However, when blocks are not defined in advance or PMIs are restricted to be different from predefined blocks, the base station and the terminal may not use a block index. In this case, the base station or the terminal transmits information indicating a range of selectable PMIs. For example, the information indicating the range of the PMIs may be configured as below in FIG. 30, FIG. 31, or FIG. 32.

Figure 30:
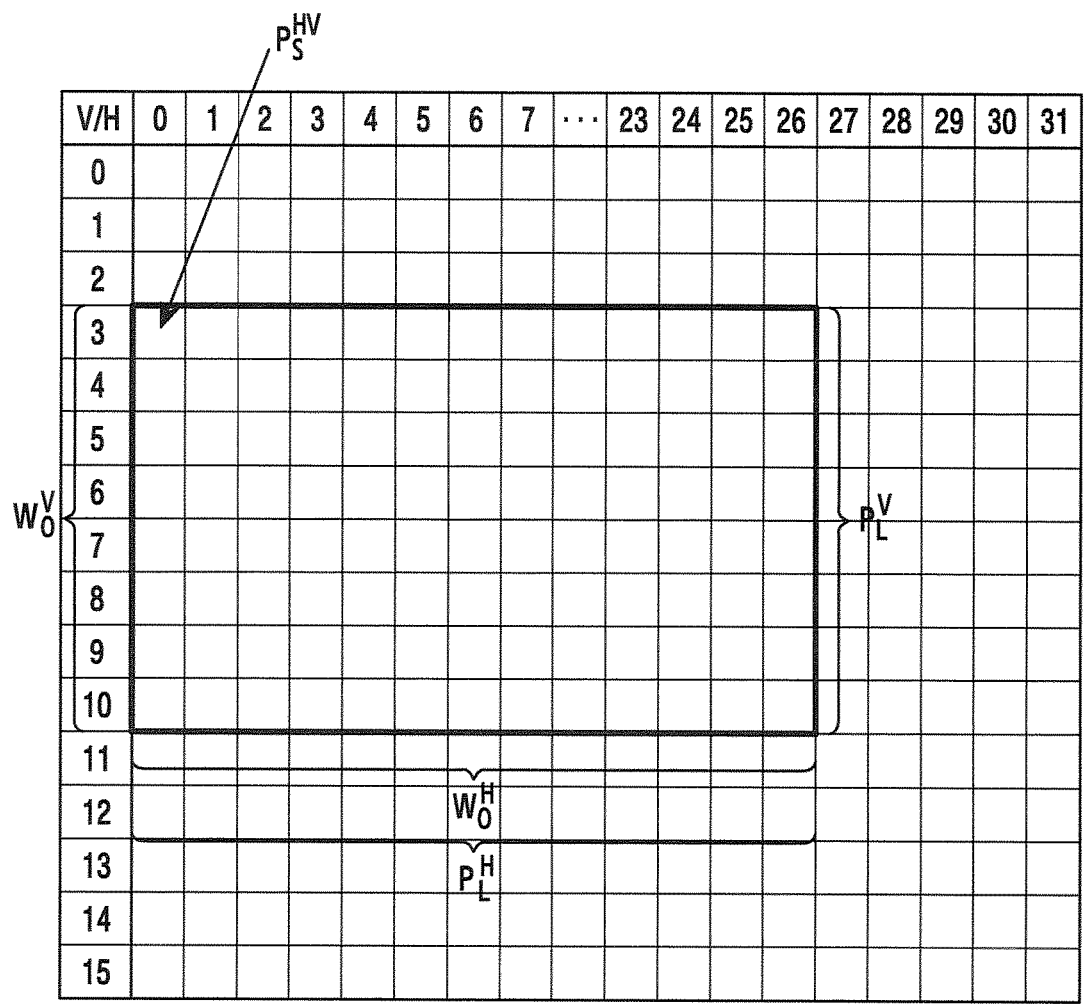
FIG. 30 illustrates the designation of a PMI block using a start point and a length in a wireless communication system according to an embodiment of the present invention.

FIG. 30 illustrates the designation of a PMI block using a start point and a length in a wireless communication system according to an embodiment of the present invention. When a PMI block is designated in a rectangular shape in a PMI table, the PMI block may be designated using a start point, a horizontal length, and a vertical length. In FIG. 30, the start point is represented by $P_S^{HV}$, the vertical length is represented by $P_L^V$, and the horizontal length is represented by $P_L^H$. Accordingly, a selectable PMI candidate group may be restricted to vertical PMIs belonging to a range $w_0^V$ and horizontal PMIs belonging to a range $w_0^H$.

Figure 31:
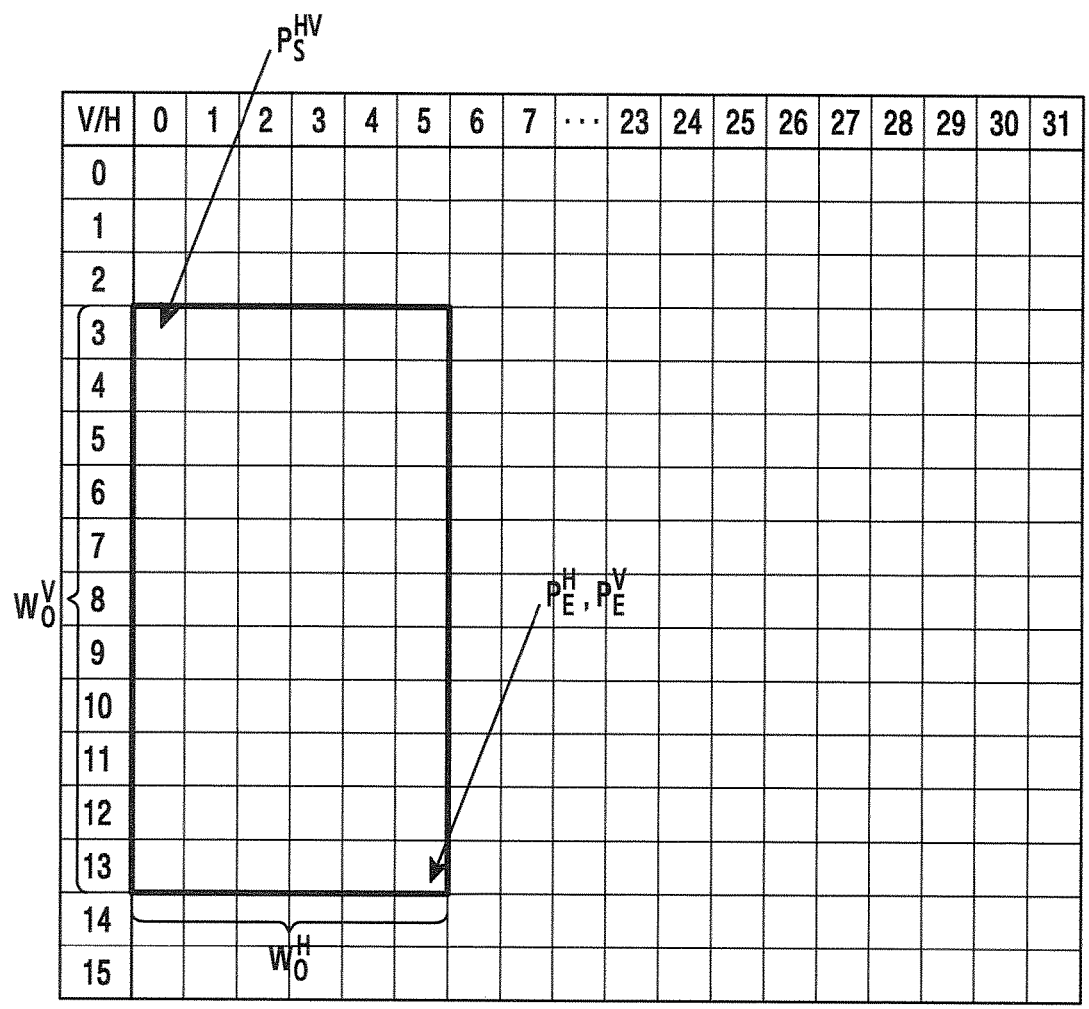
FIG. 31 illustrates the designation of a PMI block using a start point and an end point in a wireless communication system according to an embodiment of the present invention.

FIG. 31 illustrates the designation of a PMI block using a start point and an end point in a wireless communication system according to an embodiment of the present invention. When a PMI block is designated in a rectangular shape in a PMI table, the PMI block may be designated using a start point and an end point. In FIG. 31, the start point is represented by $P_S^{HV}$, and the end point is represented by $P_E^{HV}$. Accordingly, a selectable PMI candidate group may be restricted to vertical PMIs belonging to a range $w_0^V$ and horizontal PMIs belonging to a range $w_0^H$.

A PMI block may be designated using a combination of a start point, a horizontal length, and a vertical length as in FIG. 30 or using a combination of a start point and an end point. A parameter for the designation of a PMI block may be determined by the base station, and information for the designation of a PMI block may be transmitted to the terminal. Accordingly, the terminal may determine a PMI to feed back based on PMI block information. Alternatively, a parameter for the designation of a PMI block may be determined by the terminal, and information for the designation of a PMI block may be transmitted to the base station. Accordingly, the base station may interpret a PMI fed back by the terminal based on PMI block information. Here, the information for the designation of the PMI block may be transmitted through signaling via an RRC layer.

Figures 32A, 32B:
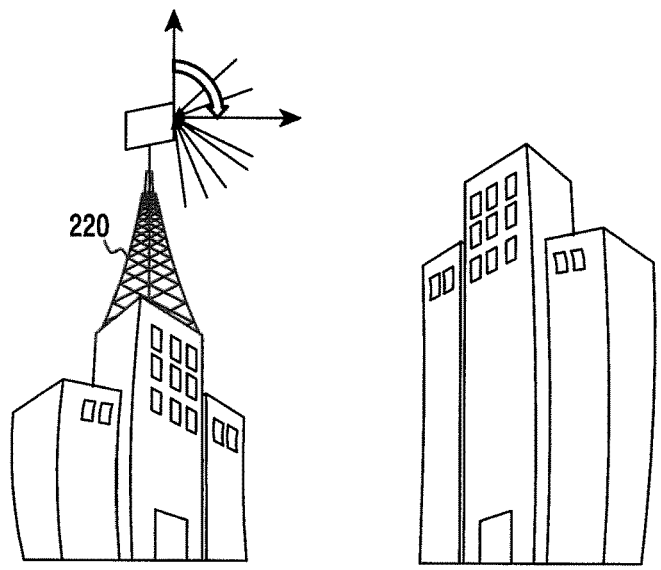
FIG. 32 illustrates an example of PMI blocks in view of the height of a base station in a wireless communication system according to an embodiment of the present invention.

FIG. 32 illustrates an example of PMI blocks in view of the height of a base station in a wireless communication system according to an embodiment of the present invention. FIG. 32 illustrates an environment in which the base station 220 is installed at a certain height or above from the ground. As illustrated in (a) of FIG. 32, the base station 220 may be installed at a position of a certain height or above from the ground (for example, the rooftop of a building). In this case, defining the vertical direction to the ground as 0°, the zenith angle to the position of a terminal is generally 90° or greater. In this case, channel information on a vertical beam with a zenith angle of 90° or greater needs to be accurately fed back to the base station to secure the performance of the terminal. To this end, as illustrated in (b) of FIG. 32, the system may increase the resolution of a vertical PMI in a range of 90° or greater and may reduce the resolution of the vertical PMI in a range of 90° or less. Information on a PMI block based on the definition of PMI blocks in (b) of FIG. 32 may be transmitted from the terminal to the base station or from the base station to the terminal through signaling via an RRC layer.

Figure 33:
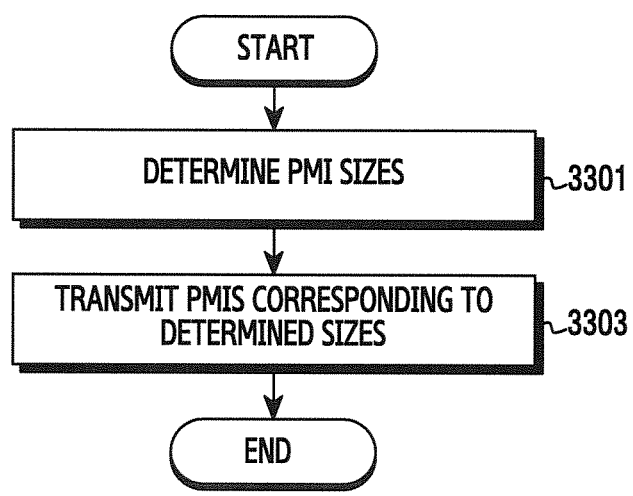
FIG. 33 illustrates an operating procedure of a terminal in a wireless communication system according to an embodiment of the present invention.

FIG. 33 illustrates an operating procedure of a terminal in a wireless communication system according to an embodiment of the present invention. FIG. 33 illustrates an operating method of the terminal 210.

Referring to FIG. 33, the terminal determines the sizes of PMIs in operation 3301. That is, the terminal determines a first size corresponding to the number of bits assigned for a first PMI and a second size corresponding to the number of bits assigned for a second PMI. For example, the terminal may determine the first size and the second size based on at least one of channel capacity, a mobility direction of the terminal, a feedback period by each PMI, the number of antennas of the base station by each axis, the level of a correlation between channels by each axis, and the number of selectable PMIs. According to another embodiment, the first size and the second size may be determined by the base station. In this case, the terminal may receive information indicating the first size and the second size determined by the base station, thereby determining the first size and the second size.

Next, the terminal transmits PMIs corresponding to the determined sizes in operation 3303. That is, the terminal transmits feedback information including the first PMI corresponding to the first size and the second PMI corresponding to the second size to the base station. For example, the first PMI may correspond to first channel information estimated based on vertical reference signals, and the second PMI may correspond to second channel information estimated based on horizontal reference signals. Here, the feedback information may further include a header to indicate the first size and the second size.

In the embodiment illustrated in FIG. 33, when PMI blocks are used, the terminal may transmit information indicating at least one of the PMI blocks. Here, the PMI blocks refer to different subsets of PMIs. The information indicating the at least one of the PMI blocks may include the index of the PMI block, the start point, the horizontal length, and the vertical length of the PMI block, or the start point and the end point of the PMI block. According to another embodiment, a PMI block may be designated by the base station. In this case, the terminal may receive information indicating at least one of the PMI blocks.

Figure 34:
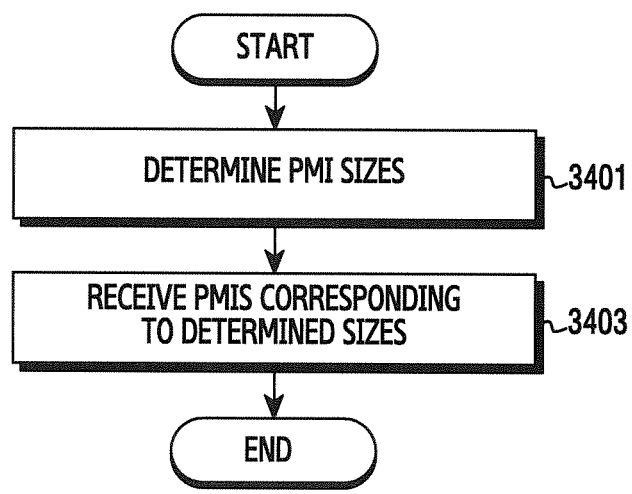
FIG. 34 illustrates an operating procedure of a base station in a wireless communication system according to an embodiment of the present invention.

FIG. 34 illustrates an operating procedure of a base station in a wireless communication system according to an embodiment of the present invention. FIG. 34 illustrates an operating method of the base station 220.

Referring to FIG. 34, the base station determines the sizes of PMIs in operation 3401. That is, the base station determines a first size corresponding to the number of bits assigned for a first PMI and a second size corresponding to the number of bits assigned for a second PMI. For example, the base station may determine the first size and the second size based on at least one of channel capacity, a mobility direction of a terminal, a feedback period by each PMI, the number of antennas of the base station by each axis, the level of a correlation between channels by each axis, and the number of selectable PMIs. According to another embodiment, the first size and the second size may be determined by the terminal. In this case, the base station may receive information indicating the first size and the second size determined by the terminal, thereby determining the first size and the second size.

Next, the base station receives PMIs corresponding to the determined sizes in operation 3403. That is, the base station receives feedback information including the first PMI corresponding to the first size and the second PMI corresponding to the second size from the terminal. For example, the first PMI may correspond to first channel information estimated based on vertical reference signals, and the second PMI may correspond to second channel information estimated based on horizontal reference signals. Here, the feedback information may further include a header to indicate the first size and the second size.

In the embodiment illustrated in FIG. 34, when PMI blocks are used, the base station may receive information indicating at least one of the PMI blocks from the terminal. Here, the PMI blocks refer to different subsets of PMIs. The information indicating the at least one of the PMI blocks may include the index of the PMI block, the start point, the horizontal length, and the vertical length of the PMI block, or the start point and the end point of the PMI block. According to another embodiment, a PMI block may be designated by the base station. In this case, the base station may determine at least one PMI block to restrict PMIs selectable by the terminal and may transmit information indicating the at least one PMI block.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present invention as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide Arear Network (WAN), and Storage Area Network (SAN) or a combination thereof. Such a storage device may access the electronic device via an external port. Further, a separate storage device on the communication network may access a portable electronic device.

In the above-described detailed embodiments of the present invention, a component included in the present invention is expressed in the singular or the plural according to a presented detailed embodiment. However, the singular form or plural form is selected for convenience of description suitable for the presented situation, and various embodiments of the present invention are not limited to a single element or multiple elements thereof. Further, either multiple elements expressed in the description may be configured into a single element or a single element in the description may be configured into multiple elements.

Although the embodiment has been described in the detailed description of the present invention, the present invention may be modified in various forms without departing from the scope of the present invention. Therefore, the scope of the present invention should not be defined as being limited to the embodiments, but should be defined by the appended claims and equivalents thereof.

The invention claimed is:

1. A method for operating a terminal in a wireless communication system, the method comprising:
receiving, from a base station, configuration information related to precoding matrix indicator (PMI) feedback, wherein the configuration information comprises a first information indicating a number of reference signals for antenna rows of the base station and a second information indicating a number of reference signals for antenna columns of the base station;
receiving, from the base station, the reference signals for antenna rows and the reference signals for antenna columns based on the first information and second information; and
transmitting, to the base station, feedback information comprising a first PMI of a first size corresponding to a number of bits assigned for the first PMI and a second PMI of a second size corresponding to a number of bits assigned for the second PMI,
wherein the first PMI is determined based on the reference signals for antenna rows, and
wherein the second PMI is determined based on the reference signals for antenna columns.

2. The method of claim 1,
wherein the configuration information comprises information indicating the first size and the second size that are determined by the base station.

3. The method of claim 1, further comprising:
transmitting information indicating at least one of PMI blocks, wherein the PMI blocks are different subsets of PMIs.

4. The method of claim 1,
wherein the configuration information comprises information indicating at least one of PMI blocks, wherein the PMI blocks are different subsets of PMIs.

5. An apparatus for a terminal in a wireless communication system, the apparatus comprising:
at least one transceiver; and
at least one processor coupled to the at least one transceiver and configured to:
receive, from a base station, configuration information related to precoding matrix indicator (PMI) feedback, wherein the configuration information comprises a first information indicating a number of reference signals for antenna rows of the base station and a second information indicating a number of reference signals for antenna columns of the base station;
receive, from the base station, the reference signals for antenna rows and the reference signals for antenna columns based on the first information and second information; and
transmit, by using the at least one transceiver, to the base station, feedback information comprising a first PMI of a first size corresponding to a number of bits assigned for the first PMI and a second PMI of a second size corresponding to a number of bits assigned for the second PMI, wherein the first PMI is determined based on the reference signals for antenna rows, and wherein the second PMI is determined based on the reference signals for antenna columns.

6. The apparatus of claim 5,
wherein the configuration information comprises information indicating the first size and the second size that are determined by the base station.

7. The apparatus of claim 5, wherein the at least one processor is further configured to:
transmit, by using the at least one transceiver, information indicating at least one of PMI blocks, wherein the PMI blocks are different subsets of PMIs.

8. The apparatus of claim 7, wherein the information indicating the at least one of the PMI blocks comprises an index of a PMI block, comprises a start point, a horizontal length, and a vertical length of the PMI block, or comprises a start point and an end point of the PMI block.

9. The apparatus of claim 5,
wherein the configuration information comprises information indicating at least one of PMI blocks, wherein the PMI blocks are different subsets of PMIs.

10. The apparatus of claim 5, wherein the feedback information comprises a header to indicate the first size and the second size.

11. The apparatus of claim 5, wherein the first PMI corresponds to first channel information estimated based on the reference signals for antenna rows, and the second PMI corresponds to second channel information estimated based on the reference signals for antenna column.

12. The apparatus of 5, wherein the first size and the second size are determined based on at least one of channel capacity, a mobility direction of the terminal, a feedback period by each PMI, a number of antennas of the base station by each axis, a level of a correlation between channels by each axis, and a number of selectable PMIs.

13. An apparatus for a base station in a wireless communication system, the apparatus comprising:
at least one transceiver; and
at least one processor coupled to the at least one transceiver and configured to:
determine a first size corresponding to a number of bits assigned for a first precoding matrix indicator (PMI) and a second size corresponding to a number of bits assigned for a second PMI,
transmit, by using the at least one transceiver, to a terminal, configuration information related to precoding matrix indicator (PMI) feedback, wherein the configuration information comprises a first information indicating a number of reference signals for antenna rows of the base station and a second information indicating a number of reference signals for antenna columns of the base station,
transmit, by using the at least one transceiver, to a terminal, the reference signals for antenna rows and the reference signals for antenna columns based on the first information and second information, and
receive, by using the at least one transceiver, from the terminal, feedback information comprising a first PMI of a first size corresponding to a number of bits assigned for the first PMI and a second PMI of a second size corresponding to a number of bits assigned for the second PMI,
wherein the first PMI is determined based on the reference signals for antenna rows, and
wherein the second PMI is determined based on the reference signals for antenna columns.

14. The apparatus of claim 13,
wherein the configuration information comprises information indicating the first size and the second size that are determined by the base station.

15. The apparatus of claim 13, wherein the at least one processor is further configured to:
receive, by using the at least one transceiver, information indicating at least one of PMI blocks from the terminal, wherein the PMI blocks are different subsets of PMIs.

16. The apparatus of claim 15, wherein the information indicating the at least one of the PMI blocks comprises an index of a PMI block, comprises a start point, a horizontal length, and a vertical length of the PMI block, or comprises a start point and an end point of the PMI block.

17. The apparatus of claim 13,
wherein the configuration information comprises information indicating at least one of PMI blocks to the terminal, wherein the PMI blocks are different subsets of PMIs.

18. The apparatus of claim 13, wherein the feedback information comprises a header to indicate the first size and the second size.

19. The apparatus of claim 13, wherein the first PMI corresponds to first channel information estimated based on the reference signals for antenna rows, and the second PMI corresponds to second channel information estimated based on the reference signals for antenna column.

20. The apparatus of 13, wherein the first size and the second size are determined based on at least one of channel capacity, a mobility direction of the terminal, a feedback period by each PMI, a number of antennas of the base station by each axis, a level of a correlation between channels by each axis, and a number of selectable PMIs.

* * * * *